United States Patent
Rameau et al.

(10) Patent No.: US 10,303,156 B2
(45) Date of Patent: May 28, 2019

(54) DETECTING CUT-OUTS

(71) Applicant: DASSAULT SYSTEMES, Velizy Villacoublay (FR)

(72) Inventors: Jean-Francois Rameau, Lisses (FR); Remy Rorato, Paris (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 342 days.

(21) Appl. No.: 15/370,306

(22) Filed: Dec. 6, 2016

(65) Prior Publication Data

US 2017/0160726 A1 Jun. 8, 2017

(30) Foreign Application Priority Data

Dec. 7, 2015 (EP) .................................. 15306947

(51) Int. Cl.
*G05B 19/4097* (2006.01)
*G06F 17/50* (2006.01)
(Continued)

(52) U.S. Cl.
CPC ..... *G05B 19/4097* (2013.01); *G06F 17/5086* (2013.01); *G06T 17/005* (2013.01); *G06T 17/10* (2013.01); *G05B 2219/35008* (2013.01); *G05B 2219/45137* (2013.01); *G05B 2219/49348* (2013.01); *G06F 2217/12* (2013.01); *G06F 2217/41* (2013.01); *G06F 2217/42* (2013.01); *Y02P 90/265* (2015.11)

(58) Field of Classification Search
CPC ... G05B 19/4097; G06T 17/005; G06T 17/10; G06F 17/5086
See application file for complete search history.

(56) References Cited

U.S. PATENT DOCUMENTS 5,251,290 A 10/1993 Pabon et al.
2006/0013505 A1 1/2006 Yau et al.

FOREIGN PATENT DOCUMENTS

WO 2004/044689 A2 5/2004
WO 2004/044689 A3 5/2004

OTHER PUBLICATIONS

Extended Search Report dated Jul. 4, 2016 in European Patent Application No. 15306947.1.
(Continued)

*Primary Examiner* — Anthony Ho
(74) *Attorney, Agent, or Firm* — Oblon, McClelland, Maier & Neustadt, L.L.P.

(57) ABSTRACT

The invention notably relates to a method for determining specifications of the input of a manufacturing operation that outputs a part having cut-outs. The method comprises providing specifications of the output part, including a user-designed B-Rep having cycles of edges and modeling the part, the cut-outs being represented by the user with tunnels in the B-Rep, determining the set that consists of all cycles being the one having the smallest length in a respective equivalence class, performing a process on the set that includes iterating replacing a cycle when this reduces the length, and deleting a cycle when a sum results in a boundary cycle, otherwise replacing the cycle by the sum when this reduces the length.

The invention offers an improved solution to detect, in a B-Rep having cycles of edges and modeling a part having cut-outs represented by tunnels, location of at least part of the tunnels.

12 Claims, 21 Drawing Sheets

(51) Int. Cl.
*G06T 17/00* (2006.01)
*G06T 17/10* (2006.01)

(56) References Cited

OTHER PUBLICATIONS

Tamal K. Dey, et al.., "Computing Geometry-aware Handle and Tunnel Loops in 3D Models", ACM SIGGRAPH, 2008, XP055281348, pp. 1-9.

Dobrina Boltcheva, et al., "An iterative algorithm for homology computation on simplicial shapes", computer-Aided Design 43, 2011, pp. 1457-1467.

Frank Harary, Graph Theory, AFOSR 70/1153 TR, This book is Addison-Wesley Series in Mathematic, 1970, 281 pages.

James R. Munkres, et al., Elements of Algebraic Topology, Massachusetts Institute of Technology, 1984, 462 pages.

Yan-Tao Li, et al., "A constructive approach to solving 3-D geometric constraint systems using dependence analysis", Computer-Aided Design 34, 2002, pp. 97-108.

ZhouPing Yin, et al., "Virtual Prototyping of mold design: geometric mouldability analysis for near-net-shape manufactured parts by feature recognition and geometric reasoning", Computer-Aided Design 33, 2001, pp. 137-154.

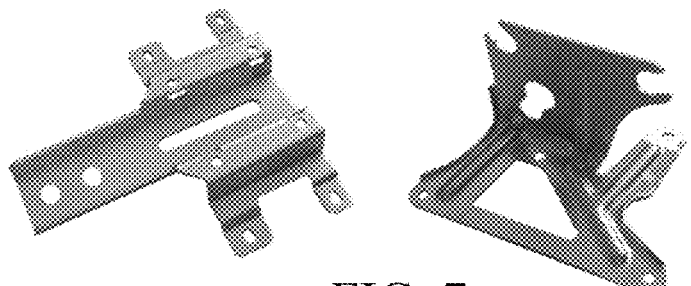
FIG. 7
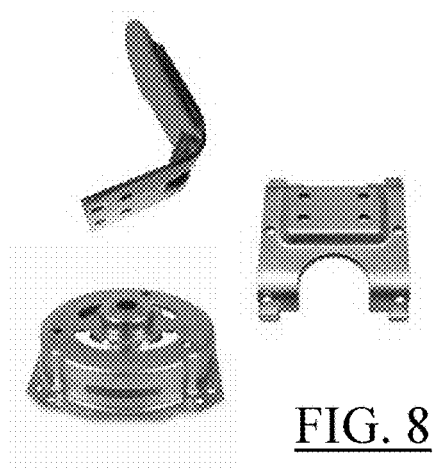
FIG. 8
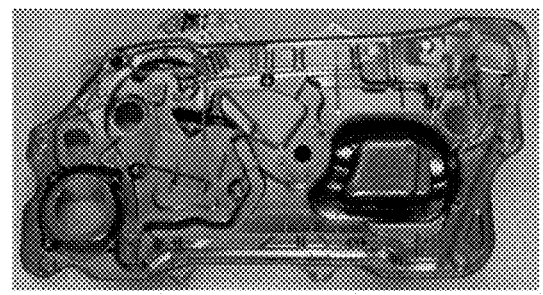
FIG. 9
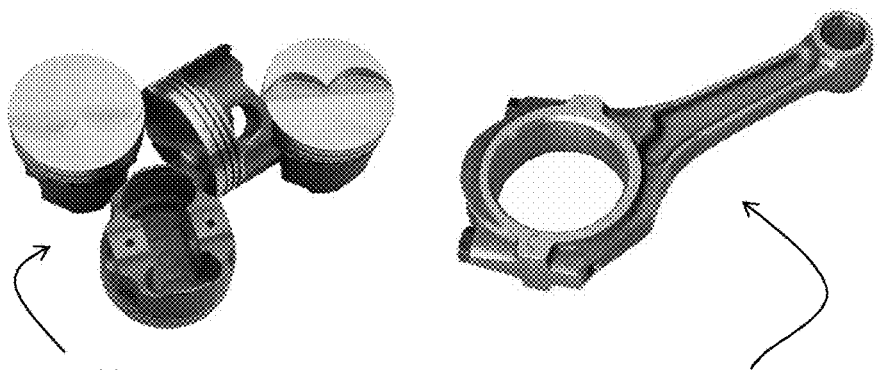
66    FIG. 10    68

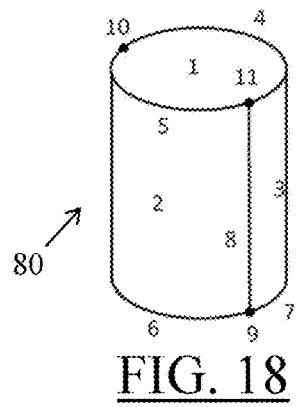
FIG. 18
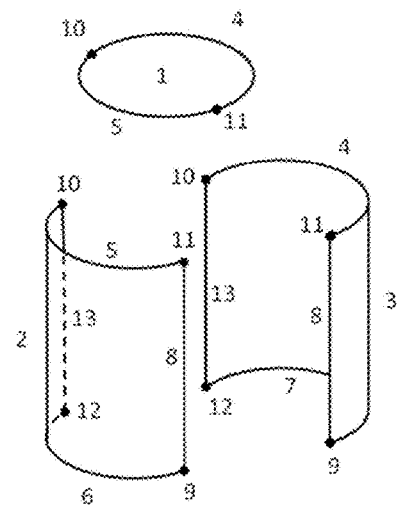
FIG. 19
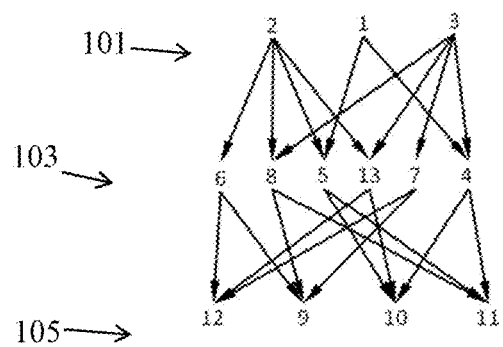
FIG. 20
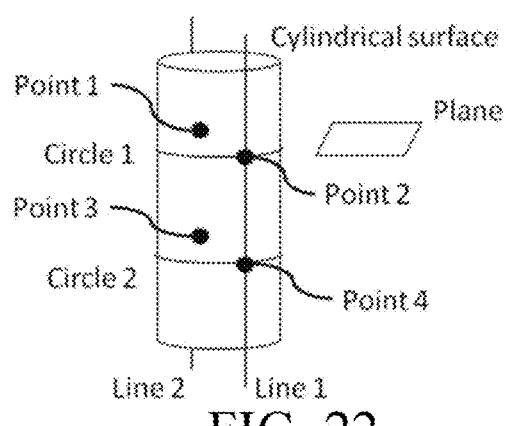
FIG. 22
| | | |
|---|---|---|
| 1 | → | Plane |
| 2 | → | Cylindrical surface |
| 3 | → | |
| 4 | → | Circle 1 |
| 5 | → | |
| 6 | → | Circle 2 |
| 7 | → | |
| 8 | → | Line 1 |
| 9 | → | Point 4 |
| 10 | → | Point 1 |
| 11 | → | Point 2 |
| 12 | → | Point 3 |
| 13 | → | Line 2 |
FIG. 21

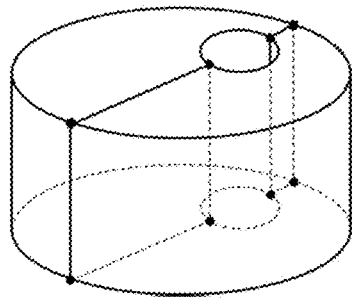
FIG. 39
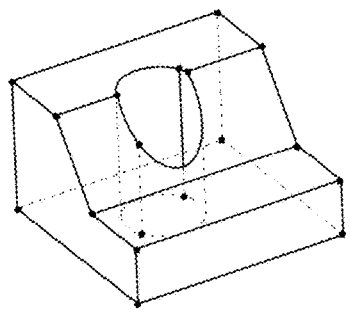
FIG. 40
FIG. 41
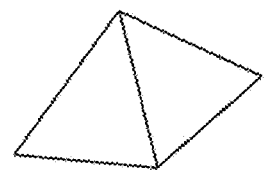
FIG. 42
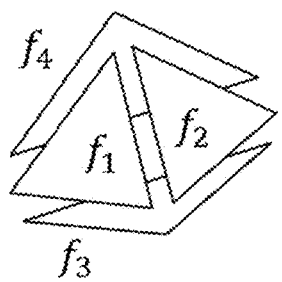 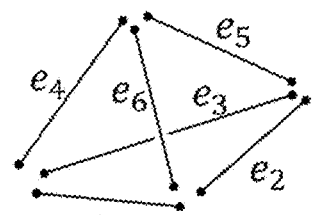 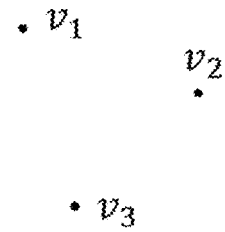
FIG. 43
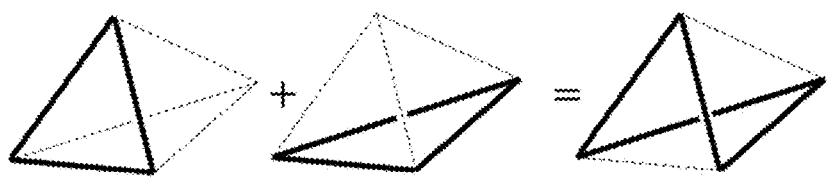
FIG. 44

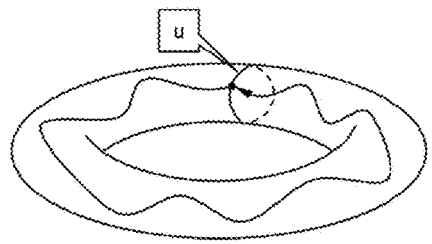
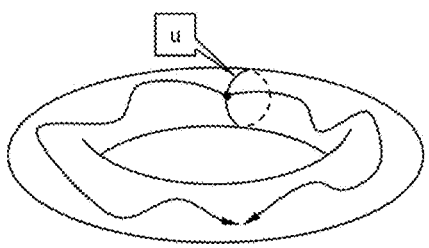
FIG. 45  FIG. 46
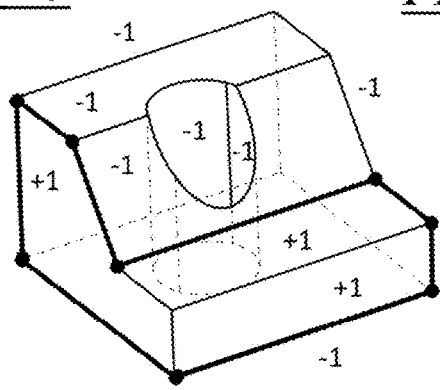
FIG. 47
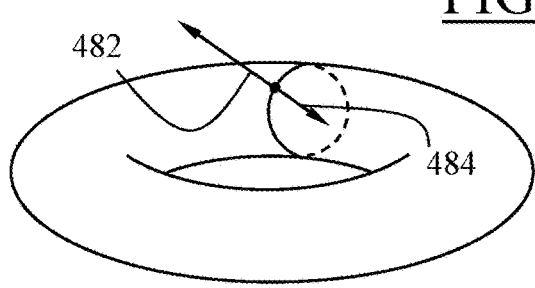
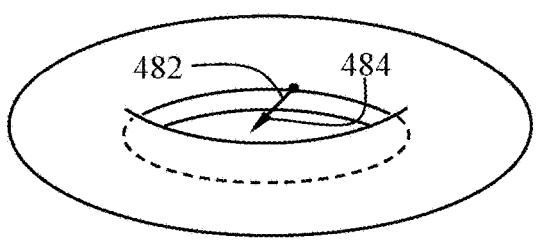
FIG. 48  FIG. 49
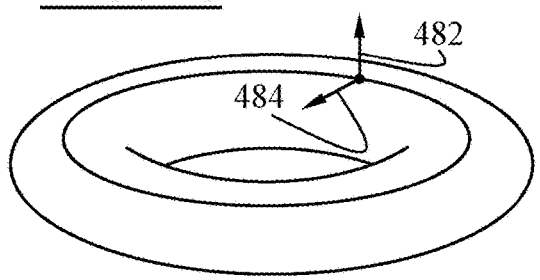
FIG. 50

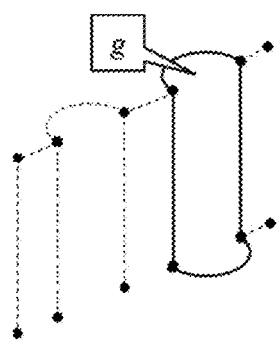
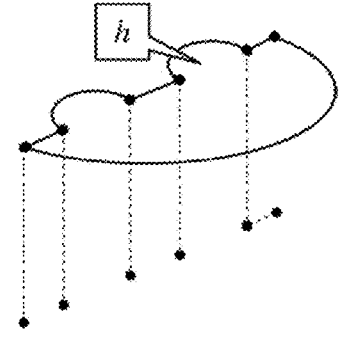
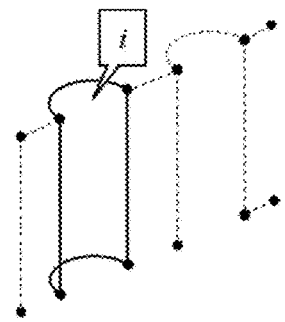
FIG. 64  FIG. 65  FIG. 66
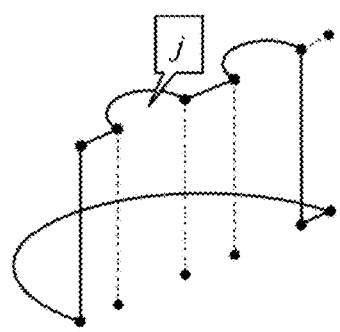
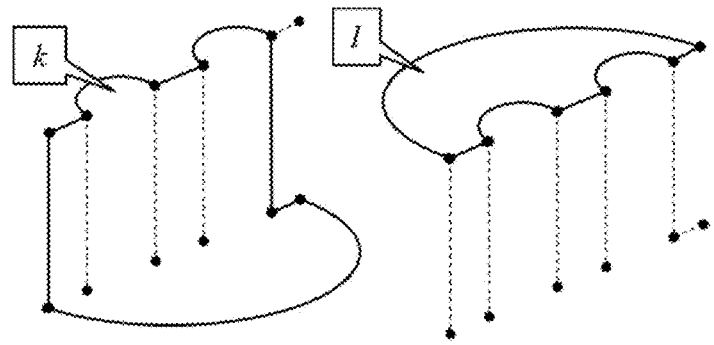
FIG. 67  FIG. 68  FIG. 69
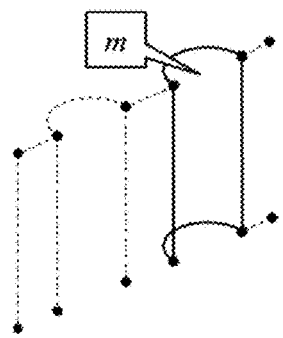
FIG. 70

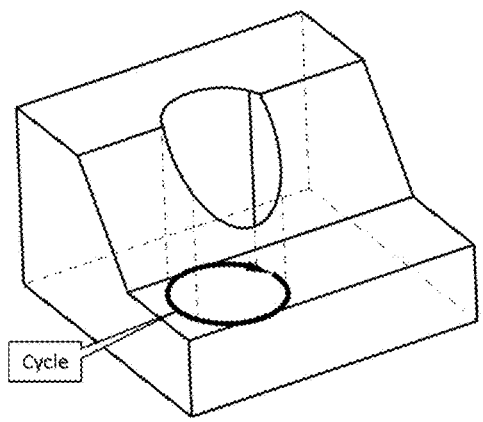
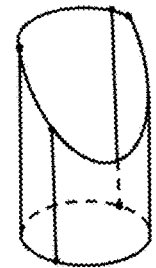
FIG. 96
FIG. 95
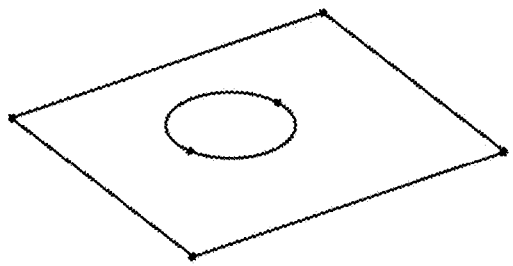
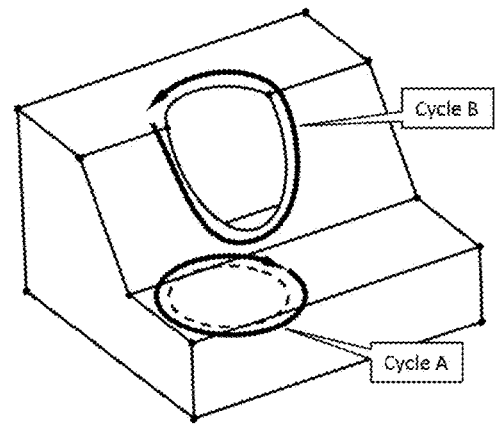
FIG. 97
FIG. 98
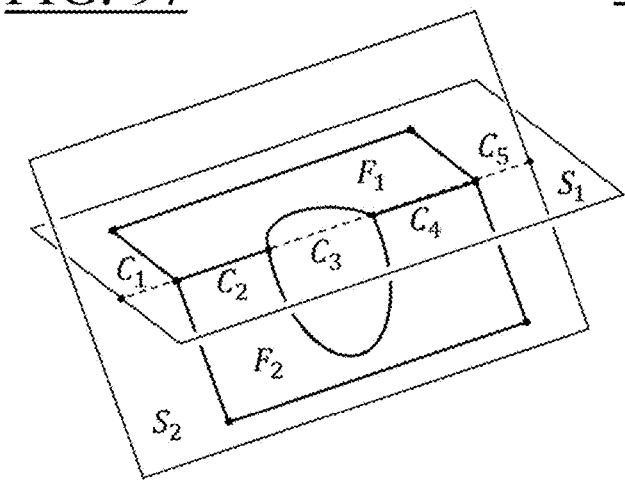
FIG. 99

DETECTING CUT-OUTS

CROSS-REFERENCE TO RELATED APPLICATIONS

This application claims priority under 35 U.S.C. § 119 or 365 to European Application No. 15306947.1, filed Dec. 7, 2015. The entire teachings of the above application(s) are incorporated herein by reference.

FIELD OF THE INVENTION

The invention relates to the field of computer programs and systems, and more specifically to a method, system and program for detecting, in a B-Rep having cycles of edges and modeling a part having cut-outs represented by tunnels, location of at least part of the tunnels.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Such systems may deal with industrializing a mechanical part represented by a virtual solid model. The industrialization may be to design the shape of the mold that is supposed to produce said part. One step to perform this industrialization is often to recognize and remove (from the input solid) details that are not produced by the molding process. These details may include holes. An issue can thus be to compute the topological invariants of a given input object according to the following meaning. A goal is to localize topological features of interest. When the input object is an image, a topological feature is a hole. When the input object is a solid, a topological feature is a tunnel (synonym for "through hole") or a handle.

From the mathematical point of view, there is no limit in the dimension of objects under study. Nevertheless, industrial algorithms deal with 2D images or 3D solids. Algorithms to recognize holes in a 2D image are designed on purpose and cannot be generalized to solids. Algorithms to automatically recognize tunnels and handles on a solid can be classified into two categories. The first one makes use of iterative matrix computations in order to get the Smith normal form of the boundary matrix representing the topology of the input object. The so-called homology generators can be easily read on the Smith normal form matrix. From these generators, tunnels and handles can be determined. A typical reference is *An iterative algorithm for homology computation on simplicial shapes,* D. Boltcheva, D. Canino, S. M. Aceituno, J. C. Léon, L. De Floriani, F. Hétroy, CAD, 43, 11 (2011) 1457-1467. The second category of algorithms performs computations on simplicial complexes. In short, a 2D simplicial complex is a triangulated graph and a 3D simplicial complex is tetrahedral mesh of a volume. A typical reference is *Computing geometry-aware handle and tunnel loops in 3D models,* T. K. Dey, K. Li, J. Sun, D. Cohen-Steiner, ACM Transactions on Graphics (TOG)—Proceedings of ACM SIGGRAPH 2008, Volume 27 Issue 3, August 2008. Commercial CAD systems also provide part simplification capabilities. They are semi-automatic in the sense that the user is supposed to select faces of the detail to remove and the system sometimes completes this selection by a local recognition. This process manages through holes as well.

This prior art has several drawbacks. Computing the Smith normal form matrix of a boundary matrix is questionable for the following reason. Coefficients of the boundary matrix are 0 and 1 but its size can be very large. Coefficients of the Smith normal form are integer numbers. They are obtained through an iterative algorithm that performs integer arithmetic computations, and intermediate results may involve large integer numbers. As opposed to floating numbers, there is no memory upper bound to represent an arbitrary large integer number in a computer. For this reason, failure cannot be excluded when computing the Smith normal form of a boundary matrix. This makes the Smith normal form technology incompatible with the industrial domain where input objects of any size must be taken into account. The second reference computes tunnels and handles of a solid model, but a drawback is that it requires a Voronoï triangulation of the B-Rep of the solid, a Voronoï 3D meshing of the inside volume of the solid and a Voronoï 3D meshing of the outside volume of the solid. In other words, the solid itself and its 3D spatial neighborhood must be meshed. Firstly, such a computation may fail because of the complexity of the meshing algorithm and the input geometry. Secondly, the computing time for meshing and topological computations is not compatible with an interactive use. Existing semi-automatic solutions of commercial CAD systems are not satisfactory because of their weak productivity.

Within this context, there is still a need for an improved solution to detect, in a B-Rep having cycles of edges and modeling a part having cut-outs represented by tunnels, location of at least part of the tunnels.

SUMMARY OF THE INVENTION

It is therefore provided a computer-implemented method for determining specifications of the input of a manufacturing operation that outputs a part having cut-outs. The manufacturing operation consists in forming the cut-outs via stamping, machining, milling and/or laser cutting. The method comprises providing specifications of the output part, including a user-designed B-Rep having cycles of edges and modeling the part, the cut-outs being represented by the user with tunnels in the B-Rep. The method also comprises determining, from equivalence classes of non-boundary cycles of the B-Rep with respect to the cycle-homology relationship, the set that consists of all cycles being the one having the smallest length in a respective equivalence class. The method also comprises performing a process on the set that includes iterating replacing a cycle of the set by its $\mathbb{Z}/2\mathbb{Z}$ sum with an adjacent boundary cycle when this reduces the length, for a cycle of the set and its $\mathbb{Z}/2\mathbb{Z}$ sum with a shorter cycle of the set, deleting the cycle when the sum results in a boundary cycle, otherwise replacing the cycle by the sum when this reduces the length. The method then comprises identifying among the cycles of the set a number n of cycles as location of tunnels, wherein n is the genus of the B-Rep. And the method then comprises editing the B-Rep by removing identified tunnels and filling the empty space, and outputting the specifications of the output part with the edited B-Rep.

The method may comprise one or more of the following:
the identifying of location of tunnels includes, for each cycle of the set, calculating a value representative of the consistence, along the cycle, between the direction of the curvature of the cycle and the outside normal of the B-Rep, the n cycles having the highest value being then identified as location of tunnels;
the value is an integral value of the sign of a scalar product between the curvature of the cycle and the outside normal of the B-Rep;
when the cycle corresponds to a sharp edge of the B-Rep and the outside normal of the B-Rep thereby consists of two vectors along the cycle, the sign of the scalar product is the maximum sign when the sharp edge is convex and the minimum sign when the sharp edge is non-convex;
the equivalence classes are identified within a basis of elementary cycles, each cycle of the B-Rep being obtainable by a $\mathbb{Z}/2\mathbb{Z}$ sum of elementary cycles;
the basis of elementary cycles is determined by computing a covering tree of the B-Rep, each elementary cycle corresponding to a respective edge outside the covering tree and being defined by adding the respective edge to the covering tree;
the process performed on the set also includes then splitting cycles of the set into simple cycles; and/or
the part is a molded part, a sheet metal piece part, a forming or thermoforming plastic part, a metal casting part, an extrusion or lamination part such as a metal rolling part.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

It is further provided a, input part of a manufacturing operation that outputs a part having cut-outs, the manufacturing operation consisting in forming the cut-outs via stamping, machining, milling and/or laser cutting, the input part being obtained by the above method.

It is further provided a method for producing the input part of a manufacturing operation that outputs a part having cut-outs, the manufacturing operation consisting in forming the cut-outs via stamping, machining, milling and/or laser cutting. The method comprises determining specifications of the input part according to the above method, and manufacturing the input part according to the determined specifications.

It is further provided a method for manufacturing a part having cut-outs; The method comprises producing the input part of a manufacturing operation that outputs the part having cut-outs according to the above method, and performing the manufacturing operation on the produced input part.

BRIEF DESCRIPTION OF THE DRAWINGS

Embodiments of the invention will now be described, by way of non-limiting example, and in reference to the accompanying drawings, where:
FIGS. 7-11 show photos of examples of industrial parts whose B-Reps can be inputted to the method;
FIGS. 95-101 illustrate an example of editing the B-Rep by removing identified tunnels and filling the empty space.

DETAILED DESCRIPTION OF THE INVENTION

Figure 1:
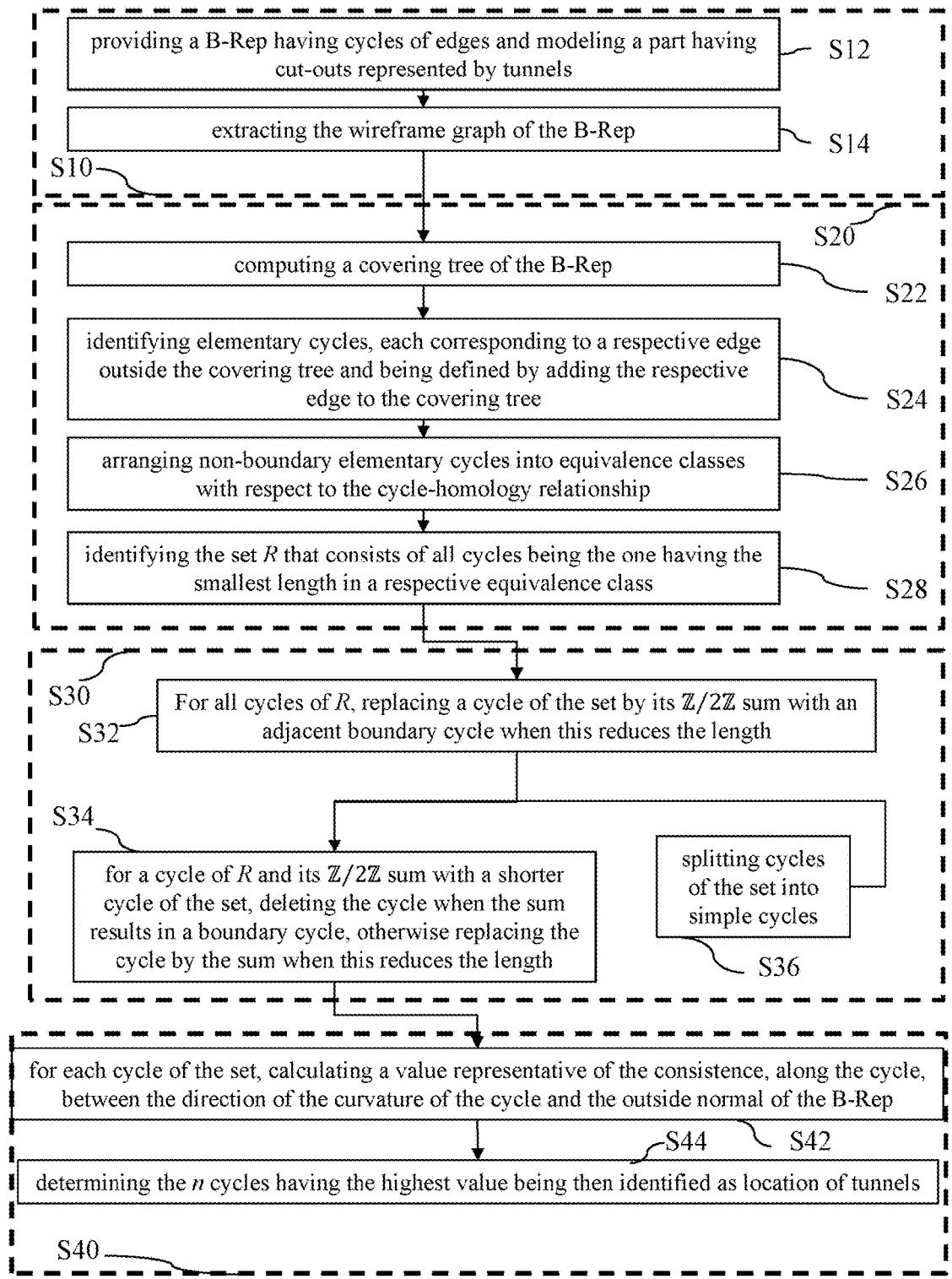
FIG. 1 shows a flowchart of an example of the detection method.

The flowchart of FIG. 1 shows an example of a computer-implemented method for detecting, in a B-Rep (i.e. boundary representation) having (by definition) cycles of edges (according to the graph theory definition of "cycles") and (the B-Rep) modeling (the outer geometry/shape of) a (e.g. mechanical) part, the part having cut-outs (also called "through holes") represented by tunnels (each cut-out being represented by a respective tunnel of the B-Rep, which tunnels are known from the field of CAD and can be referred to as the cut-outs—or through holes—that they represent), location of at least part of the tunnels. The method of the example comprises determining S20, from equivalence classes of non-boundary cycles of the B-Rep with respect to the (well-known and defined later) cycle-homology relationship, the set R that consists of all cycles being the one having the smallest length in a respective equivalence class (that is, for all the considered equivalences classes, which may include all such candidate equivalence classes or a subset thereof, the method considers the cycle having the smallest length, cumulated/summed along the edges of the cycle, in terms of—e.g. Euclidian—distance, being noted that cases where two such cycles are equally the smallest ones can be handled in any way, for example arbitrarily, and the method defines and considers set R accordingly for the following). The method also comprises performing a process S30 on the set R that includes an iteration (as will be apparent, process S30 dynamically modifies set R such that the input of the iteration—i.e. set R—accordingly dynamically evolves). The iteration is performed in any order, e.g. potentially in the order described later. The iteration includes, at some time(s), replacing S32 a cycle of (e.g. current) set R (the cycle considered at a given iteration being selected in any way, e.g. the method looping on all cycles of set R) of the set by its $\mathbb{Z}/2\mathbb{Z}$ sum (which is known as such but defined later, for the sake of clarity) with an adjacent boundary cycle when this reduces the length (in other words, the iteration may comprise evaluating whether or not the replacement would reduce length and performing the replacement only when it does, such conditional behavior being obviously known to the person skilled in computer science and thus not represented on FIG. 1 and not further discussed). The iteration also includes, at some time(s), for a cycle of (e.g. current) set R (again, selected in any way) and its $\mathbb{Z}/2\mathbb{Z}$ sum with a shorter cycle of set R (again, selected in any way, e.g. the iteration possibly looping through all such candidate shorter cycles), S34 deleting the cycle when the sum results in a boundary cycle (being noted that non-boundary cycles are being summed), and otherwise (i.e. else) replacing the cycle by the sum when this reduces the (above-defined) length (e.g. and yet otherwise doing nothing). The method then comprises identifying S40 among the cycles of set R (as resulting from the iterated process S30) a number n of cycles as location of tunnels, wherein n is the genus of the B-Rep (n being mathematically uniquely defined and related to the Euler index of the B-Rep, as discussed later, the method possibly comprising determining n prior to S40 and/or retrieving it if it is provided among the B-Rep data).

Such a method improves detection of cut-outs of a part, as it improves, in a B-Rep modeling the part, detection of the location of tunnels (e.g. previously not localized, i.e. the B-Rep does not include any data allowing direct retrieval—i.e. determination without any processing and/or computations—of the tunnels) representing the cut-outs (e.g. assigning a tunnel type flag/value to location(s) of the B-Rep, e.g. where such a type value was not present). Notably, thanks to the systematic approach of the method, in specific during the iteration of process S30, the method allows an automatic detection of tunnels, without involving the user (or with relatively little user-involvement). Furthermore, due to the specific mathematical framework underlying the computerization (cycle algebra and $\mathbb{Z}/2\mathbb{Z}$ sums) and the fact that process S30 reduces the scope of application of the identifying S40, the method is performed relatively fast and relatively lightly (from a hardware resource—e.g. CPU—point of view), thereby leading to a more accurate result (relatively less false negative and/or relatively less false positive) and/or in a more robust and real-time interaction manner. This holds true even when the part is relatively large (in terms of numbers of geometry), for example when the part includes more than 50, 100 or yet 500 faces (e.g. and more than 100, 500 or yet 1000 edges, and a corresponding number of vertices). Indeed, in such situations, examples of the method can still converge in less than 1 minute, or even 20 seconds, to an industrially verified and accurate result, as discussed later.

The method of FIG. 1 may be part of a general computer-implemented method for determining specifications of the input of a manufacturing operation that outputs a part having cut-outs, the manufacturing operation consisting in forming the cut-outs via stamping, machining, milling and/or laser cutting. The process starts from provided (e.g. received and/or retrieved) specifications of the output part, including a user-designed B-Rep having cycles of edges and modeling the part, the cut-outs being represented by the user with tunnels in the B-Rep. In other words, prior to the elements shown on FIG. 1, a user (e.g. a mechanical designer) has designed a B-Rep (e.g. freely, such as without actively localizing tunnels therein, the tunnels only deriving from the definition of the B-Rep) that models the (e.g. mechanical) part (that is, the B-Rep represents physical shape of the mechanical part, in other words, the physical part that may eventually be manufactured, in a more general process of manufacturing such a part based on a data processing of said specific B-Rep). Then, the process detects (e.g. automatically, e.g. at another user workspace, e.g. having received the specifications from the initial designer) at least part of the tunnels, according to the method of FIG. 1. And then the process includes (e.g. via user-interaction) editing the B-Rep by removing the identified tunnels and filling the empty space, and outputting (e.g. sending and/or storing on local and/or distant—e.g. non-volatile—memory) the specifications of the output part with the edited B-Rep (that is, the specifications initially provided, but integrating the editions performed (e.g. via user-interaction) based on the detected tunnel locations (e.g. including at least one of the tunnel—for example all detected tunnels—being removed, i.e. virtually filled in by material, and the B-Rep being thereby modified accordingly).

The method may comprise a further step of designing a lower and/or an upper matrix of a mold adapted for the manufacturing of the input. Such a designing is performed by a direct adaptation of the outputted specifications (e.g. automatically or semi-automatically), as known per se. Indeed, the lower and/or upper matrix may be designed such that they correspond complementarily to the 3D geometry provided by said outputted specifications. The method may then comprise producing such lower and/or upper matrix based on the design thereof.

Figure 2:
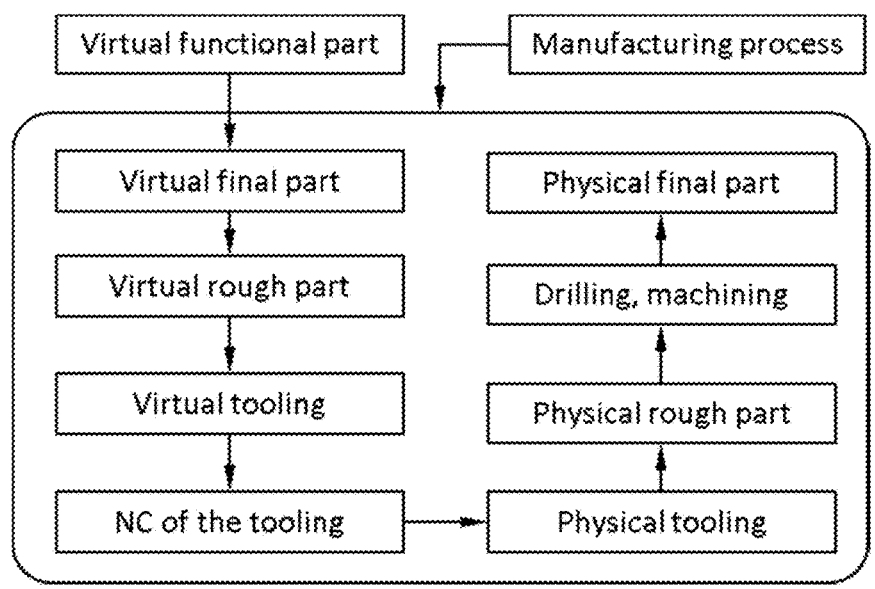
FIGS. 2-6 illustrate a general manufacturing process involving the method of FIG. 1.

In an example, such a method may be included as one step of a general process that starts with the design of a virtual product using a CAD system and that ends with machining the tool that is dedicated to manufacture the said product (based on the outputted specifications of the output part, which also directly correspond to the specifications of the mold). Manufacturing methods that may take benefit of the invention may involve a casting step (including die casting or sand casting), a molding step (including compression molding or injection molding), a forging step and/or a stamping step. These methods yield a preliminary version of the physical part, named the rough part, which does not feature all the details of the final product. Then, in a further step, small details are machined on the rough part by using drilling tools, cutting tools or punching tools. These details are mainly blind holes, through holes and/or functional surfaces. The diagram of FIG. 2 shows an example of the general process. Left top-down flow is the virtual world. Right bottom-up flow is the real world.

Figure 3:
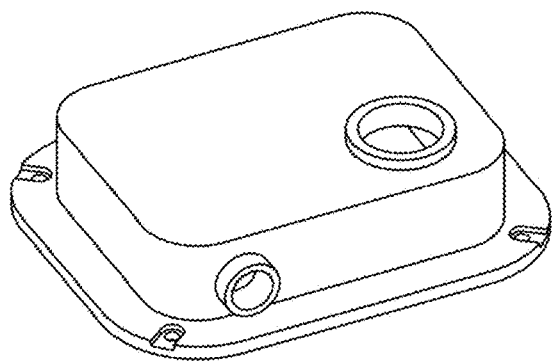
Figure 4:
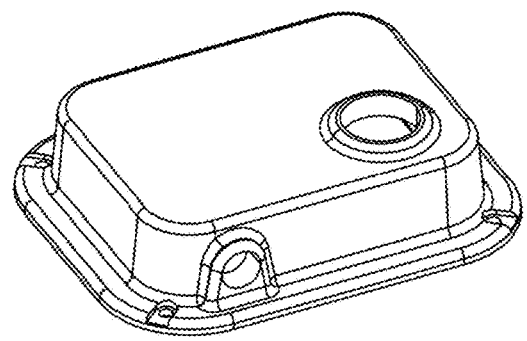
Figure 5:
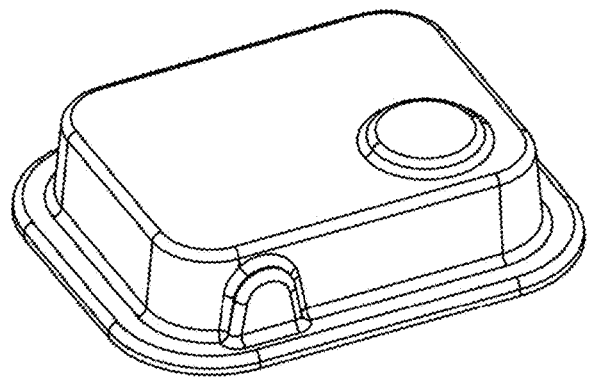
Figure 6:
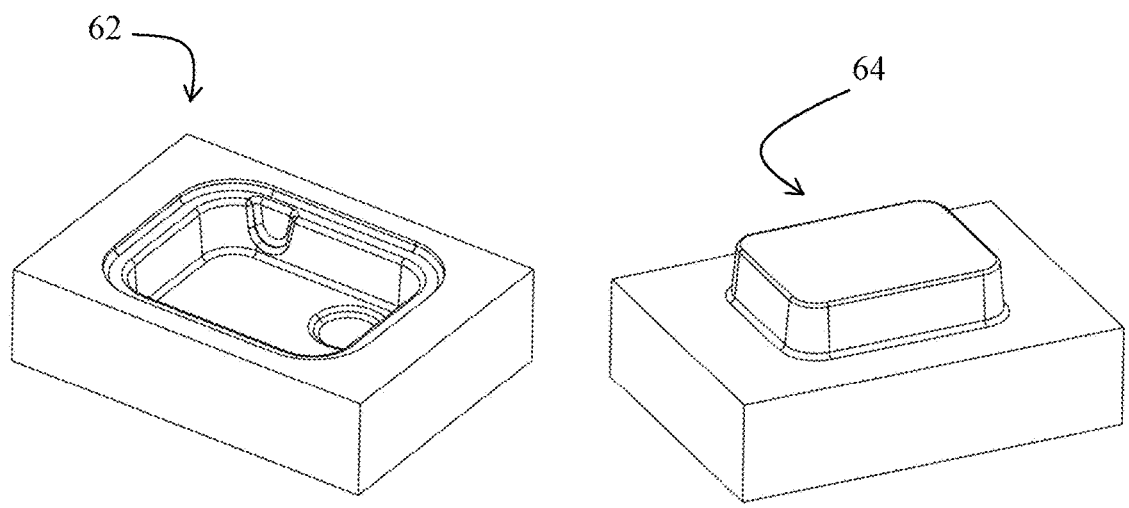

In an example, from the CAD system point of view, the data flow may run as follows. Firstly, the user designs the functional version of the virtual part. The focus is on how the part fulfils its specifications, its geometry is very simple and does not depend of any manufacturing process. FIG. 3 illustrates a typical functional part. It features six through holes. In a second step, the user designs the final version of the virtual part by adding geometries related to the manufacturing process. For example, a molded or casted part always features draft surfaces, rounds and fillets. FIG. 3 shows an example of such final part. Notice how the lateral opening is reworked for undercut purpose. The next step is to design the virtual shape of the tooling. This shape is obtained by removing details from the final part in order to get the rough part, as illustrated in FIG. 4. This is where the method of FIG. 1 is used to detect through holes, for then removal. Then, the virtual shapes of upper and lower molding matrices (or forging matrices) are based on the shape of the rough part. FIG. 6 illustrates typical molding matrices. Left matrix 62 is named the cavity, right matrix is named the core 64. These shapes are then used to prepare the numerical command (NC) to actually machine the physical molding matrices (or forging matrices). The example process may determine these data based on the outputted specifications, as will be appreciated by the skilled person.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined. In an example, referring to FIG. 1, the providing S12 may be triggered by a user (e.g. launching a cut-out/tunnel detection functionality of the software/system), and the rest of the steps shown on the figure may be performed fully automatically. Afterwards steps (not shown on the figure, e.g. removal of detected tunnels) may be performed fully automatically or via user-interaction.

A typical example of computer-implementation of the method is to perform the method with a system adapted for this purpose. The system may comprise a processor coupled to a memory—e.g. and a graphical user interface (GUI)—, the memory having recorded thereon a computer program comprising instructions for performing the method. The memory may also store a database. The memory is any hardware adapted for such storage, possibly comprising several physical distinct parts (e.g. one for the program, and possibly one for the database).

The method includes conditional processes. This typically concerns S32 and S34. But this can even concern S20, as the part may simply have no cut-out at all, in which case the absence of detection can be seen as a detection of a null—or void—result, which also needs to be performed robustly as false negative are as an issue as false positive are (being noted that the handling of such null situations is a mere matter of implementation, the remainder of the discussion focusing on cases where it is assumed that cut-outs are present and thus to be detected). Thus, depending on the part on which it is applied, advantages of the method may be highlighted. The method proves particularly advantageous when the B-Rep of the part has been designed via a process where tunnels are detectable by the method, which is most often the case when the part has been designed by a user of CAD system, e.g. a mechanical engineering designer. A computer program comprising instructions to perform the method thus proves to be a useful tool in the part design industry.

The method generally manipulates modeled objects, as the B-Rep is a modeled object. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g. mechanical) part (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

In examples, the part may be a molded part, a sheet metal piece part, a forming or thermoforming plastic part, a metal casting part, or an extrusion or lamination part such as a metal rolling part. Indeed, as known per se from the field of mechanical engineering, such parts generally have cutouts that correspond to stamping, machining, milling and/or laser cutting (depending on the material and/or the related manufacturing process contemplated for the part). The method thus allows detection of location of such cut-outs in the B-Reps that model these parts. The locations may be outputted as the n cycles identified at S40 as such, or with any type of post-processing (which is an implementation detail). Then, as known from the prior art, the method may further comprise removing the identified tunnels (e.g. all or part thereof, e.g. at least one, e.g. depending on user-decision and/or automatically or manually or semi-automatically) from the B-Rep, and optionally filling the empty space. This can be performed via any classical method known as such from the prior art, possibly with slight adaptations (notably to bridge the output of the method of FIG. 1 to the input required in such prior art methods, such an adaptation including for example the determination of faces adjacent to each cycle identified at S40 that correspond to the inside of the cut-out and that are thus to be removed). This can involve user-interaction, as for example the identified tunnels may be highlighted to the user, and/or the user may validate the result and/or decide when and/or how to remove them and/or fill them.

As known per se and as discussed above, in many industries parts are manufactured by performing cut-outs (i.e. obtained by a material discontinuous removal process, e.g. by the above-mentioned stamping, machining, milling and/or laser cutting) in a material matrix (i.e. obtained by a material continuous deforming process—that preserves at least substantially the quantity of material, e.g. the above-mentioned molding, sheet metal shaping, plastic forming or thermoforming, metal casting, and/or extrusion or lamination part, such as metal rolling). However, the designer typically models the final part (that is, with its cut-outs) without inserting any specific information on cut-out location. This allows the mechanical designer to focus on his part of the job. Then, the method of FIG. 1 allows the retrieval of the specific industrial process that comes after the matrix shaping (that is, the application of cut-outs in the matrix), and thus the method helps designing the whole manufacturing process e.g. by identifying candidates for the above-mentioned removal locations. This post-application of the method is as discussed above, but the method of FIG. 1 relates in specific to the issue of determining the location of the tunnels.

Figure 11:
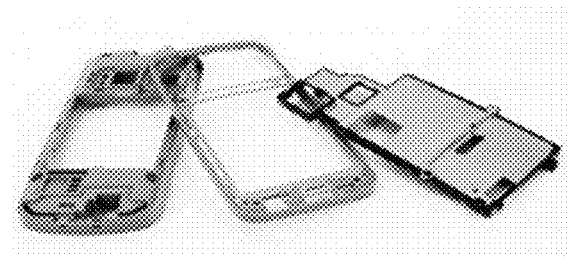

FIGS. 7-11 show photos of examples of industrial parts whose B-Reps can be inputted to the method of FIG. 1. FIG. 7 shows examples of sheet metal parts. FIG. 8 shows examples of metal stamping parts for the automotive industry. FIGS. 9 show examples of composites parts for the aerospace and automotive industry. FIG. 10 shows an example 66 of a casted and machined part for the automotive industry and an example 68 of a forged and machined part for the automotive industry. FIG. 11 shows an example of a plastic molded part for the consumer goods industry.

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

By CAE solution, it is additionally meant any solution, software of hardware, adapted for the analysis of the physical behavior of modeled object. A well-known and widely used CAE technique is the Finite Element Method (FEM) which typically involves a division of a modeled objet into elements which physical behaviors can be computed and simulated through equations. Such CAE solutions are provided by Dassault Systèmes under the trademark SIMULIA®. Another growing CAE technique involves the modeling and analysis of complex systems composed a plurality components from different fields of physics without CAD geometry data. CAE solutions allows the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 12:
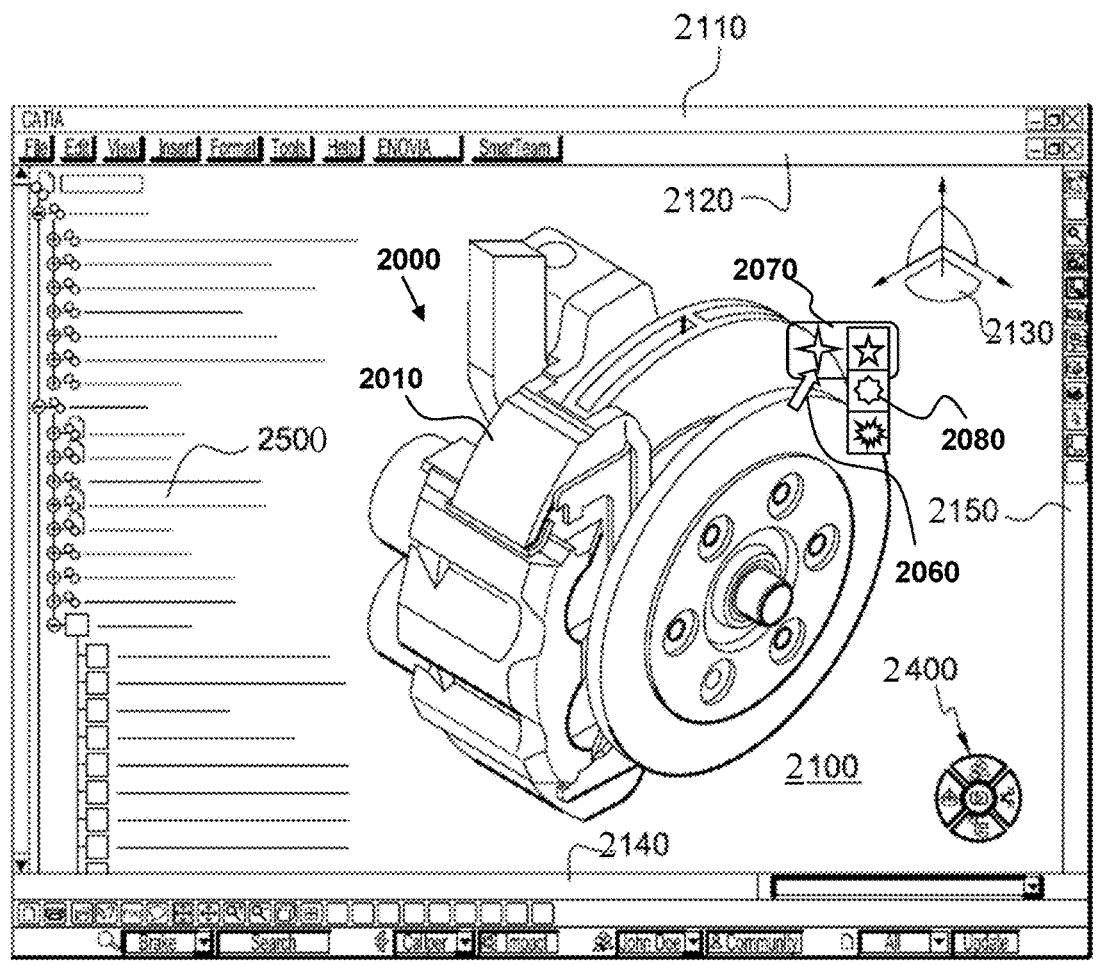
FIG. 12 shows an example of a graphical user interface of the system.

FIG. 12 shows an example of the GUI of the system, wherein the system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of FIG. 12, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 13:
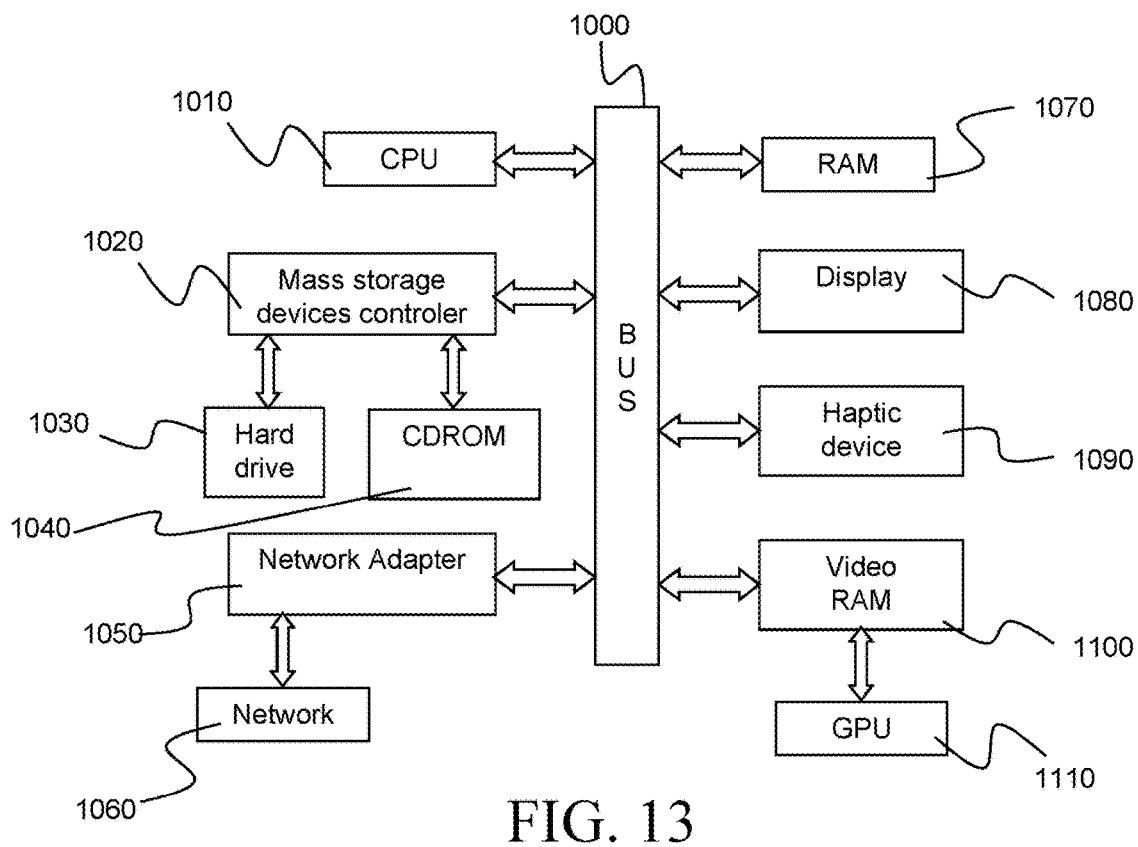
FIG. 13 shows an example of the system.

FIG. 13 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

As mentioned earlier, the method or a prior process may comprise the design of the B-Rep, e.g. by an industrial designer. "Designing a 3D modeled object" designates any action or series of actions which is at least part of a process of elaborating a 3D modeled object. Thus, the method may comprise creating the 3D modeled object from scratch. Alternatively, the method may comprise providing the B-Rep of a 3D modeled object previously created, and then modifying the 3D modeled object.

The method may be included in a manufacturing process, which may comprise, after performing the method, producing a physical product corresponding to the modeled object, for example first without the cut-outs if the tunnels have been removed from the B-Rep (and possibly afterwards performing the cut-outs). In any case, the modeled object designed by the method may represent a manufacturing object. The modeled object may thus be a modeled solid (i.e. a modeled object that represents a solid). The manufacturing object may be a product, such as a part, or an assembly of parts. Because the method improves the design of the modeled object, the method also improves the manufacturing of a product and thus increases productivity of the manufacturing process.

The method of FIG. 1 is now discussed in more details, referring to FIGS. 14-55 and to well-known concepts of algebraic topology and graph theory, discussed for example in the following books: *Elements of algebraic topology*, James R. Munkres, Addison-Wesley, 1984 and *Graph Theory*, Frank Harary, Addison Wesley 1969.

Figure 14:
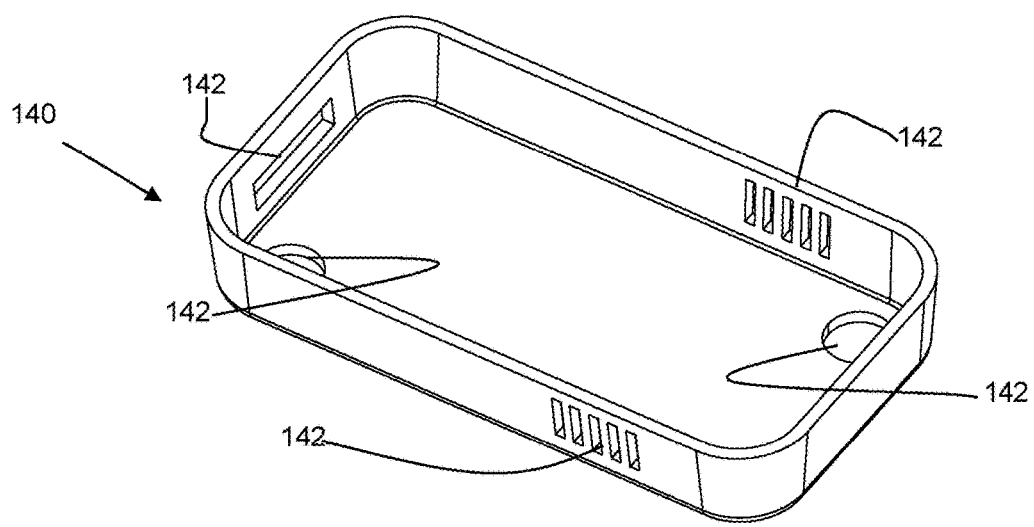
FIGS. 14-94 illustrate the method.
Figure 15:
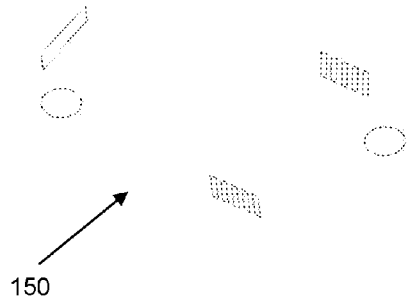
Figure 16:
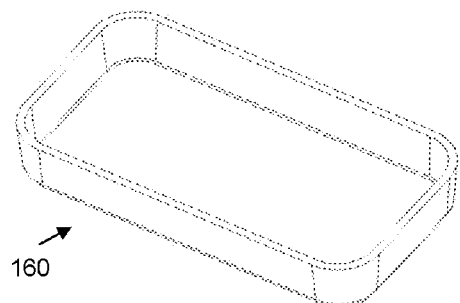

Given the solid model of a mechanical part (e.g. the B-Rep), a goal of the method may be to identify and localize (e.g. all) through holes (i.e. tunnels in the B-Rep). A further step of the industrial process may be to remove these through holes in order to design the shape of the corresponding mold. Through holes recognition makes use of the "combinatorial algebraic topology" mathematical theory. By performing algebraic computation with cycles on the B-Rep of the solid, and by contracting these cycles to their minimal length and tension at S20 and S30, the method may compute topological "tunnels" and "handles" of the solid (being noted that these topological concepts are known per se). Through holes are localized by "tunnel" cycles. FIG. 14 shows an example of a part 140 featuring through holes 142. FIG. 15 illustrates the tunnel cycles 150 to be recognized by the method. FIG. 16 illustrates the part 160 corresponding to part 140 from which through holes 142 are removed. This step is the next step of the industrialization process (relative to the method shown on FIG. 1) and is not extensively discussed in the following.

The method provides automatic recognition of through holes: no user selection is required. When advantageously combined with feature removal, this provides the user with a valuable tool for molding design. The method is useful as well to add editable features to a pure B-Rep obtained through a STEP format translator for example. Recognizing through holes allows the creation of an editable "through hole" feature replacing the geometrical through hole. Thus, the method can be used to improve a feature recognition process. Furthermore, the method algorithm only deals with the B-Rep model (and more particularly minimal information required in the B-Rep model) of the input solid as opposed to other data structures and computations (integer number matrices, Voronoï meshing). This makes the method robust.

Figure 17:
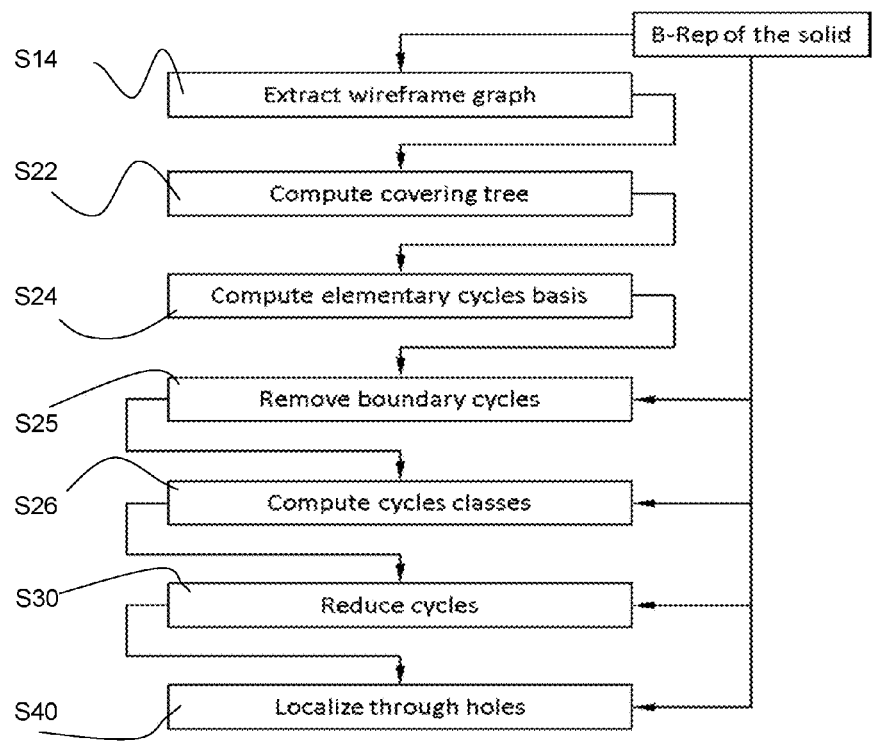

FIG. 17 shows an example overall structure of the method of FIG. 1. Referring to both FIG. 1 and FIG. 17, the first block S10 corresponds to the provision of the input data of the method. In the example, the B-Rep of a solid part is provided at S12 and then the method of the example extracts S14 the wireframe graph from the B-Rep of the solid, but the wireframe graph may alternatively be provided as such or computed from other data. Then, the method of the example performs the second block which is to determine S20 the set R that is to be processed so as to provide the output. First, a covering tree is of the wireframe graph is computed at S22. This covering tree defines a basis of elementary cycles, from which the boundary cycles are removed S25 (because boundary cycles cannot localize through holes). Such removal S25 is not shown on FIG. 1 because it can merely be performed by omission and thus be conceptual (rather than corresponding to an actual data deletion). The main topological process is then to reduce the remaining non-boundary cycles e.g. as much as possible (block S30). This step makes use of the whole B-Rep, including vertices, edges and faces. Finally, wire tension information is used in the final block S40 to identify tunnel cycles among the reduced cycles.

The input of the method is the well-known B-Rep format that models a solid. As widely known, a B-rep model includes topological entities and geometrical entities. Topological entities are: face, edge, and vertex. Geometrical entities are 3D objects: surface, plane, curve, line, point. By definition, a face is a bounded portion of a surface, named the supporting surface. An edge is a bounded portion of a curve, named the supporting curve. A vertex is a point in 3D space. They are related to each other's as follows. The bounded portion of a curve is defined by two points (the vertices) lying on the curve. The bounded portion of a surface is defined by its boundary, this boundary being a set of edges lying on the surface. Edges of the face's boundary are connected together by sharing vertices. Faces are connected together by sharing edges. By definition, two faces are adjacent if they share an edge. Similarly, two edges are adjacent if they share a vertex. Such information is enough input data for the method.

FIGS. 18 and 19 illustrate the B-rep model of a cylindrical slot 80 that may be provided at S12 and that is made of three faces numbered 1, 2 and 3 on the figures: top planar face 1 and two lateral cylindrical faces 2 and 3. FIG. 18 shows a perspective view of slot 80. FIG. 19 shows the exploded view of all faces. Duplicated numbers illustrate edges and vertices sharing. Face 1 is a bounded portion of a plane. Boundary of face 1 includes edges 4 and 5, each of them being bounded by vertices 10 and 11. They both have the same supporting circle. Face 2 is bounded by edges 6, 8, 5 and 13 all lying on an infinite cylindrical surface (i.e. the supporting surface of face 2). Faces 1 and 2 are adjacent because they share edge 5. Faces 2 and 3 are adjacent because they share edges 8 and 13. Faces 1 and 3 are adjacent because they share edge 4.

FIG. 20 illustrates the "is bounded by" topological relationship of the B-rep model of slot 80. Nodes of higher layer 101 are faces, nodes of intermediate layer 103 are edges and nodes of lower layer 105 are vertices. FIGS. 21 and 22 illustrate the relationship between topological entities (faces, edges, vertices) and the supporting geometries (infinite cylinder, infinite plane, infinite line, points). In the CAD system, the B-rep model gathers in an appropriate data structure the "is bounded by" relationship and the relationship between topological entities and supporting geometries, and mathematical descriptions of supporting geometries. In other words, the data structures shown on FIGS. 20 and 21 are part of the topological data of this example, which comprise links to geometrical entities of the geometrical data (this is FIG. 21) and links between topological entities (this is FIG. 20).

Figure 23:
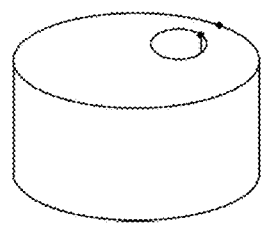
Figure 24:
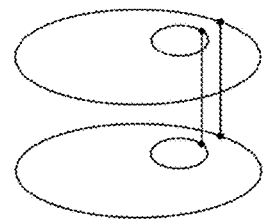
Figure 25:
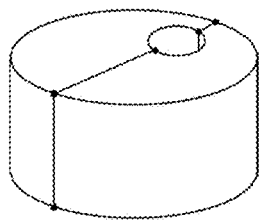
Figure 26:
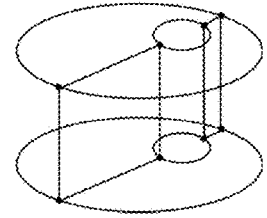

The method of FIG. 1 may include an optional pre-processing of the B-Rep provided at S12. In order to simplify the use of Euler formulas (for counting cycles and genus), the method may ensure that faces do not feature internal loops. Furthermore, for compliancy with the algebraic model, it may be ensured that edges do not start and end at the same vertex, and an edge do not occur twice in the boundary of the same face. The technical reason is related to the boundary operator definition and is explained later. This does not restrict the shape of solids taken into account by the method. Indeed, the topological artifact is to add extra vertices in loops defined by only one edge, and to split faces featuring inner loops by creating bridge edges joining said loops. For example, FIGS. 23-24 illustrate unwanted topology. FIG. 23 is the solid (4 faces, 6 edges and 4 vertices) and FIG. 24 is its wireframe graph. It may be replaced by the topology illustrated respectively on FIG. 25 and FIG. 26 (8 faces, 16 edges and 8 vertices), featuring added vertices and split faces. As expected, the topology of the solid's B-Rep is changed, but not its shape.

Concepts well-known from algebraic topology and used by the method are now introduced to the discussion. A goal of the introduction is to provide an overall view of the concepts used by the method. The mathematical formalism is detailed in next section.

The concepts of cycles and boundary cycles are first discussed.

Given a closed skin in the 3D space, a cycle is intuitively a single closed loop on said skin. Intuitively, a boundary cycle is a loop that is the boundary of a portion of the skin: cutting the skin along a boundary cycle separates two pieces. A non-boundary cycle is the contrary of a boundary cycle: there exist no portions of the skin that can be bounded by a non-boundary cycle. Intuitively, cutting the skin along a non-boundary cycle does not separate two pieces.

A goal of algebraic topology is to classify cycles on a given skin into two categories: boundary cycles and non-boundary cycles. Furthermore, a goal is also to classify the non-boundary cycles into a minimum set of independent cycles (set R, as detailed later). It turns out that the localization of through holes of a solid is to be better found among non-boundary cycles of its B-Rep.

Figure 27:
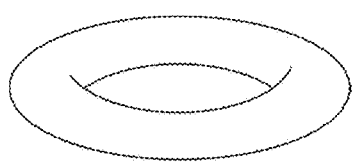
Figure 28:
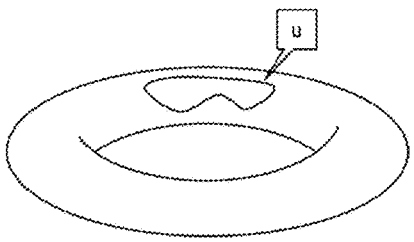
Figure 29:
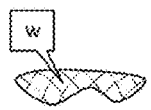
Figure 30:
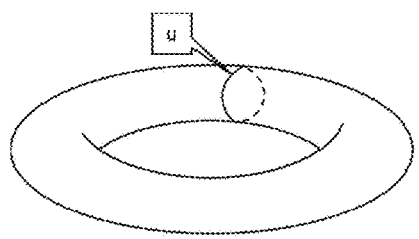
Figure 31:
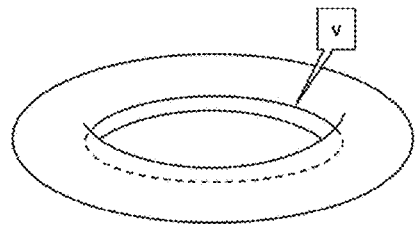

FIG. 27 illustrates the skin of a torus. It is a closed and oriented skin in the 3D space. FIG. 28 illustrates a boundary cycle u on the torus skin. FIG. 29 illustrates a portion w of the torus skin bounded by cycle u. Notice that the complementary skin is also bounded by cycle u. FIGS. 30-31 illustrate non-boundary cycles u and v: cutting the torus skin according to cycle u (resp. v) does not separate the skin. Cycle u on FIG. 30 localizes a handle, cycle v on FIG. 31 localizes a tunnel. Despite it is intuitively obvious, proving that cycles u and v are non-boundary cycles and proving that, in some sense, they are unique and independent, require high level mathematics. This is the aim of algebraic topology.

The concept of equivalent cycles is now discussed.

Figure 32:
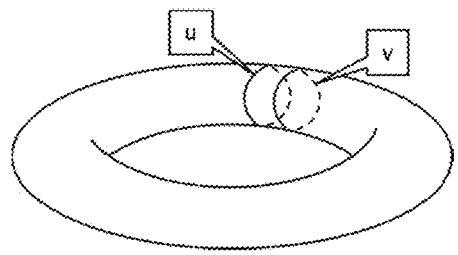
Figure 33:
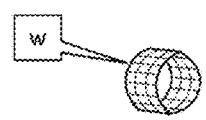

One key feature of the theory is an equivalence relationship among the set of cycles: the so called "homology" relationship. By definition, given a closed skin S, two cycles u and v on S are homologous is there exists a portion w of S such that u "and" v, noted u+v, is the boundary of w. The symbolization u+v is formally defined later. For example, cycle u and cycle v on the torus skin in FIG. 32 are homologous because they are the boundary of the small tubular skin w (portion of the torus skin) illustrated in FIG. 33. From the theoretical point of view, non-boundary cycles are sorted out as equivalence classes of the homology relationship, as detailed later.

An example of counting of the number of handles is now discussed.

Figure 34:
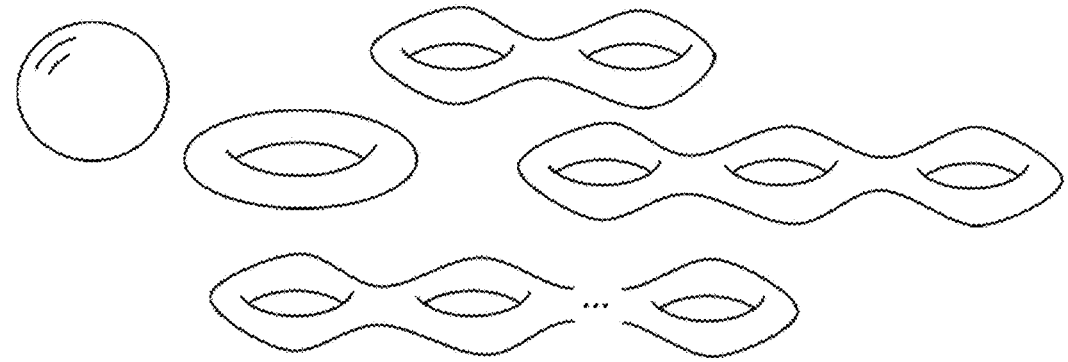
Figure 35:
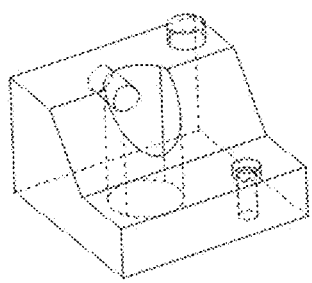
Figure 36:
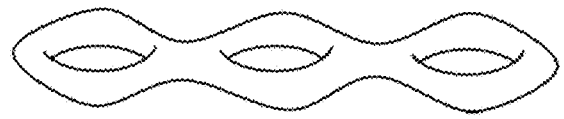
Figure 37:
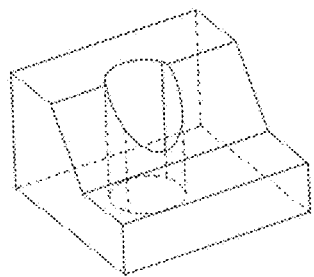
Figure 38:
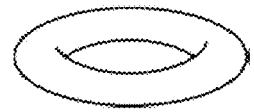

One theorem of differential geometry states that any single closed skin (in the 3D space) can be smoothly deformed into: a sphere, a torus, a double torus, a triple torus, etc., as illustrated in FIG. 34. By definition, a torus features one handle, a double torus features two handles, etc. For example, the mechanical part of FIG. 35 is equivalent to triple torus of FIG. 36 because it features three through holes. Similarly, the mechanical part of FIG. 37 is equivalent to the torus of FIG. 38 because it features one through hole.

Furthermore, if the skin is described by a topological graph (typically a triangulated mesh, or the compliant topology of a solid's B-Rep) then, the number γ of handles, named the genus of the skin, is easily computed by using a so called Euler formula. Noting $n_2$ the number of faces, $n_1$ the number of edges and $n_0$ the number of vertices, the genus γ is such that:

$$n_0 - n_1 + n_2 = 2(1-\gamma)$$

FIG. 39 illustrates previous formula with a compliant B-Rep: $n_0=8$ vertices, $n_1=16$ edges and $n_2=8$ faces, so that γ=1. An equivalent Euler formula is available for solid's B-Rep featuring faces with inner loops. Noting $n_l$ is the number of inner loops, the formula is as follows.

$$n_0 - n_1 + n_2 - n_l = 2(1-\gamma)$$

FIG. 40 illustrates the Euler formula on a non-compliant B-Rep: $n_0=18$ vertices, $n_1=27$ edges, $n_2=10$ faces and $n_l=1$ inner loop (bottom face) so that γ=1. Finally, according to algebraic topology, the non-boundary cycles of interest (the number of generators of the homology group $H_1$, as explained later), is exactly 2γ: one cycle per handle and one cycle per tunnel (though hole), as illustrated in FIG. 41.

The method makes use of these results to anticipate the number of minimum non-boundary cycles. In short, by identifying at S20 the equivalence classes of non-boundary cycles within a basis of elementary cycles (i.e. each equivalence class being identified as a respective subset of the basis), the basis of elementary cycles being by definition such that each cycle of the B-Rep is obtainable by a (e.g. not necessarily unique) $\mathbb{Z}/2\mathbb{Z}$ sum of elementary cycles (the example of how to determine such basis implemented by the method of FIG. 1 being detailed later), the method basically implements what algebraic topology does in a simple way: (1) among all cycles on a given skin, ignore the boundary cycles, (2) among the non-boundary cycles find those who locate tunnels and handles and focus on tunnels only.

Algebraic topology background is now discussed in more details.

The method makes use of the abstract and complex mathematics of combinatorial algebraic topology. Not all the details of this theory can be given within the scope of the method, so only useful concepts and operations are detailed.

The whole theory deals with simplicial complexes of arbitrary dimension, but the useful part of the theory relates to cycles on a closed and oriented 3D skin, typically the B-Rep of a solid model. Before reaching this use, the theory is introduced for triangulated closed skins in 3D space.

p-Chains

The topology of a triangulated skin Σ is defined as follows. Let $n_2$ be the number of triangles, $n_1$ the number of edges and $n_0$ the number of vertices. Let $C_2=\{0,1\}^{n_2}$ be the set of vectors made of $n_2$ coordinates, each of them being 0 or 1. Same definition for $C_1=\{0,1\}^{n_1}$ and $C_0=\{0,1\}^{n_0}$. Triangle number $i\in\{1,\ldots,n_2\}$ of skin Σ is associated with vector $f_i \in C_2$ with all coordinates equal to 0 except the i-th coordinate which is equal to 1. Same definition for edge number $i\in\{1,\ldots,n_1\}$ of Σ, which is associated with vector $e_i \in C_1$ with all coordinates equal to 0 except the i-th coordinate which is equal to 1. Finally, vertex number $i\in\{1,\ldots,n_0\}$ of Σ is associated with vector $v_i \in C_0$ with all coordinates equal to 0 except the i-th coordinate which is equal to 1.

A goal is to associate algebraic objects (vectors) with topological entities (faces, edges, vertices). In fact, geometrical data (coordinates of vertices, normal vectors of triangles) is not relevant for the present purpose.

Now, $C_2$, $C_1$ and $C_0$ are equipped with the addition modulo 2, noted +. Operation + combines integers 0 and 1 according to the following rules: 0+1=1+0=1, 0+0=0 and 1+1=0. The appropriate notations are now $C_2=(\mathbb{Z}/2\mathbb{Z})^{n_2}$, $C_1=(\mathbb{Z}/2\mathbb{Z})^{n_1}$ and $C_0=(\mathbb{Z}/2\mathbb{Z})^{n_0}$. This allows performing algebraic combinations of triangles, edges and vertices through vectors addition. Sums of triangles are called "2-chains", sums of edges are called "1-chains", and sums of vertices are called "0-chains". Indeed, one key feature of algebraic topology is to deal with topology by using algebra.

For example, consider a tetrahedral polyhedral skin, as illustrated in FIG. 42. It includes $n_2=4$ triangles, $n_1=6$ edges and $n_0=4$ vertices, as illustrated in FIG. 43. So, according to the definitions, $C_2=(\mathbb{Z}/2\mathbb{Z})^4$ and $$f_1 = \begin{pmatrix} 1 \\ 0 \\ 0 \\ 0 \end{pmatrix} f_2 = \begin{pmatrix} 0 \\ 1 \\ 0 \\ 0 \end{pmatrix} f_3 = \begin{pmatrix} 0 \\ 0 \\ 1 \\ 0 \end{pmatrix} f_4 = \begin{pmatrix} 0 \\ 0 \\ 0 \\ 1 \end{pmatrix}$$

Similarly, $C_1=(\mathbb{Z}/2\mathbb{Z})^6$ and $$e_1 = \begin{pmatrix} 1 \\ 0 \\ 0 \\ 0 \\ 0 \\ 0 \end{pmatrix} e_2 = \begin{pmatrix} 0 \\ 1 \\ 0 \\ 0 \\ 0 \\ 0 \end{pmatrix} e_3 = \begin{pmatrix} 0 \\ 0 \\ 1 \\ 0 \\ 0 \\ 0 \end{pmatrix} e_4 = \begin{pmatrix} 0 \\ 0 \\ 0 \\ 1 \\ 0 \\ 0 \end{pmatrix} e_5 = \begin{pmatrix} 0 \\ 0 \\ 0 \\ 0 \\ 1 \\ 0 \end{pmatrix} e_6 = \begin{pmatrix} 0 \\ 0 \\ 0 \\ 0 \\ 0 \\ 1 \end{pmatrix}$$

Finally, $C_0=(\mathbb{Z}/2\mathbb{Z})^4$ and $$v_1 = \begin{pmatrix} 1 \\ 0 \\ 0 \\ 0 \end{pmatrix} v_2 = \begin{pmatrix} 0 \\ 1 \\ 0 \\ 0 \end{pmatrix} v_3 = \begin{pmatrix} 0 \\ 0 \\ 1 \\ 0 \end{pmatrix} v_4 = \begin{pmatrix} 0 \\ 0 \\ 0 \\ 1 \end{pmatrix}$$

Boundary Operators

The connectivity of triangles, edges and vertices is captured by so-called boundary operators, traditionally noted $\partial_p$. The boundary operator $\partial_2: C_2 \to C_1$ describes how triangles are bounded by edges. It is a linear operator from $C_2$ to $C_1$ defined by a matrix featuring 0,1 coefficients spread through $n_1$ rows and $n_2$ columns. Similarly, the boundary operator $\partial_1: C_1 \to C_0$ describes how edges are bounded by vertices. It is a linear operator from $C_1$ to $C_0$ defined by a matrix featuring 0,1 coefficients spread through $n_0$ rows and $n_1$ columns. By nature, $\partial_1 \circ \partial_2 = 0$, meaning that the boundary of a boundary has no boundary. Given $w \in C_p$, the typical formalism is $\partial_p w = \Sigma_{i=1}^k \sigma_i$ with $\sigma_i \in C_{p-1}$ for all i. The boundary operator can be noted $\partial$ instead of $\partial_p$ when it is not ambiguous.

With this model, a bounding entity (vertex, edge) occurs either zero or one time (and not twice or more) in the boundary of the bounded entity (edge, face). Consequently, an edge cannot start and end at the same vertex and cannot occur twice or more in the boundary of the same face.

Back to the example, and according to the connectivity defined in FIG. 43, the boundary operator $\partial_2$ is as follows.

$$\partial_2 = \begin{pmatrix} 1 & 0 & 1 & 0 \\ 0 & 1 & 1 & 0 \\ 0 & 0 & 1 & 1 \\ 1 & 0 & 0 & 1 \\ 0 & 1 & 0 & 1 \\ 1 & 1 & 0 & 0 \end{pmatrix}$$

The topological information "triangle $f_1$ is bounded by edges $e_1$, $e_4$ and $e_6$" is the result of the following matrix-vector product. It computes the boundary of $f_1$.

$$\partial_2 f_1 = \begin{pmatrix} 1 & 0 & 1 & 0 \\ 0 & 1 & 1 & 0 \\ 0 & 0 & 1 & 1 \\ 1 & 0 & 0 & 1 \\ 0 & 1 & 0 & 1 \\ 1 & 1 & 0 & 0 \end{pmatrix} \begin{pmatrix} 1 \\ 0 \\ 0 \\ 0 \end{pmatrix} = \begin{pmatrix} 1 \\ 0 \\ 0 \\ 1 \\ 0 \\ 1 \end{pmatrix} = \begin{pmatrix} 1 \\ 0 \\ 0 \\ 0 \\ 0 \\ 0 \end{pmatrix} + \begin{pmatrix} 0 \\ 0 \\ 0 \\ 1 \\ 0 \\ 0 \end{pmatrix} + \begin{pmatrix} 0 \\ 0 \\ 0 \\ 0 \\ 0 \\ 1 \end{pmatrix} = e_1 + e_4 + e_6$$

Thanks to previous definitions, the formalism $\partial_2 f_1 = e_1 + e_4 + e_6$ is now rigorous. Notice that the sequence of edges in the triangle boundary has no importance because addition is a commutative operation.

The boundary operator $\partial_1$ is as follows.

$$\partial_1 = \begin{pmatrix} 0 & 0 & 0 & 1 & 1 & 1 \\ 0 & 1 & 1 & 0 & 1 & 0 \\ 1 & 1 & 0 & 0 & 0 & 1 \\ 1 & 0 & 1 & 1 & 0 & 0 \end{pmatrix}$$

The topological information "edge $e_3$ is bounded by vertices $v_2$ and $v_4$" is the result of the following matrix vector product.

$$\partial_1 e_3 = \begin{pmatrix} 0 & 0 & 0 & 1 & 1 & 1 \\ 0 & 1 & 1 & 0 & 1 & 0 \\ 1 & 1 & 0 & 0 & 0 & 1 \\ 1 & 0 & 1 & 1 & 0 & 0 \end{pmatrix} \begin{pmatrix} 0 \\ 0 \\ 1 \\ 0 \\ 0 \\ 0 \end{pmatrix} = \begin{pmatrix} 0 \\ 1 \\ 0 \\ 1 \end{pmatrix} = \begin{pmatrix} 0 \\ 1 \\ 0 \\ 0 \end{pmatrix} + \begin{pmatrix} 0 \\ 0 \\ 0 \\ 1 \end{pmatrix} = v_2 + v_4$$

Here again, the formalism $\partial_1 e_3 = v_2 + v_4$ is totally rigorous. Notice that the sequence of vertices in the edge boundary has no importance because addition is a commutative operation.

Finally, it can be checked that, as expected, $\partial_2 \circ \partial_1 = 0$, keeping in mind that $1+1=0$ in $\mathbb{Z}/2\mathbb{Z}$.

$$\partial_2 \circ \partial_1 = \begin{pmatrix} 0 & 0 & 0 & 1 & 1 & 1 \\ 0 & 1 & 1 & 0 & 1 & 0 \\ 1 & 1 & 0 & 0 & 0 & 1 \\ 1 & 0 & 1 & 1 & 0 & 0 \end{pmatrix} \begin{pmatrix} 1 & 0 & 1 & 0 \\ 0 & 1 & 1 & 0 \\ 0 & 0 & 1 & 1 \\ 1 & 0 & 0 & 1 \\ 0 & 1 & 0 & 1 \\ 1 & 1 & 0 & 0 \end{pmatrix} = \begin{pmatrix} 0 & 0 & 0 & 0 \\ 0 & 0 & 0 & 0 \\ 0 & 0 & 0 & 0 \\ 0 & 0 & 0 & 0 \end{pmatrix}$$

This formalism allows combination of chains according to a very simple rule. The sum u+v of two chains includes elements of u that are not in v and elements of v that are not in u.

Cycles

Thanks to this algebraic background, the formal definition of a cycle and a boundary cycle are as follows. A 1-chain u is a 1-cycle if $\partial_1 u = 0$. A 1-cycle u is boundary cycle if there exists a 2-chain w such that $\partial_2 w = u$. Because $\partial_1 \circ \partial_2 = 0$, a boundary is always a cycle, but the reverse is not necessarily true, as previously illustrated with the torus skin.

Back to the example, the 1-chain $s = e_6 + e_5 + e_3 + e_1$ is a cycle because $\partial_1 s = 0$ and it is also a boundary cycle because $\partial_2(f_2 + f_3) = s$. In the tetrahedron example, all cycles are boundary cycles.

The method of FIG. 1 may massively combine 1-cycles, as illustrated in FIG. 44. If $u = e_4 + e_1 + e_6$ and $v = e_1 + e_2 + e_3$, then $u+v = e_4 + e_6 + e_2 + e_3$.

Homology Relationship

Let $\mathrm{Ker}\partial_1 \subset C_1$ be the group of 1-cycles, that is the kernel of boundary operator $\partial_1$:

$\mathrm{Ker}\partial_1 = \{u \in C_1, \partial_1 u = 0\}$

By definition, two 1-cycles $u, v \in \mathrm{Ker}\partial_1$ are homologous if there exists a 2-chain $w \in C_2$ such that $u + v = \partial_2 w$. The homology relationship is an equivalence relationship, so, according to basic algebra, it defines equivalent classes on $\mathrm{Ker}\partial_1$. By definition, the homology group $H_1$ includes these equivalent classes. More precisely, let $\mathrm{Im}\partial_2$ be the group of 2-chains boundaries:

$\mathrm{Im}\partial_2 = \{\partial_2 w, w \in C_2\}$

By construction, the homology group $H_1$ is the quotient group $H_1 = \mathrm{Ker}\partial_1 / \mathrm{Im}\partial_2$. This algebraic process provides a structure on the set of 1-cycles that are not boundary cycles. One goal of the invention is to compute the generators of $H_1$.

The following property is very useful to the method. If u and v are homologous, and if s is a boundary cycle, then u+s and v are also homologous. The proof is as follows. Since u and v are homologous, there exists a chain w such that $u + v = \partial_2 w$. Since s is a boundary cycle, there exists a chain t such that $s = \partial_2 t$. So, $$u + s + v = u + v + s$$
$$= \partial_2 w + \partial_2 t$$
$$= \partial_2 (w + t)$$

meaning that u+s and v are homologous.

In the example of FIG. 1, the basis of elementary cycles is determined by computing S22 a covering tree of the B-Rep, each elementary cycle (identified at S24) corresponding to a respective edge outside the covering tree and being defined by adding the respective edge to the covering tree (indeed, the covering tree ensuring such a result, by definition).

Computing the covering tree is now discussed.

The covering tree is useful to create the basis of elementary cycles. The input of the algorithm is a non-oriented graph. The output is a labelling "2" of edges that belong to the covering tree. Before starting the algorithm, all vertices and all edges are labeled "0". The algorithm uses a last-in-first-out (LIFO) list as an internal variable. The label of entity z is noted m(z). Labelling entity z with value k is symbolized by instruction m(z):=k.

```
While exists a vertex x such that m(x) = 0 do begin
    Put vertex x in LIFO list
    m(x) := 1
        While the LIFO list is not empty do begin
            Get vertex x from LIFO list
            For all edge u incident to x do begin
                If m(u) = 0 then
                    Let y be the other end vertex of edge
                    u
                    If m(y) = 0 then
                        m(u) := 2
                        Put vertex y in the LIFO list
                        m(y) := 1
                    else
                        m(u) := 1
                    End if
                End if
            End for
        End while
End while
```

It should be noticed that the covering tree is not unique, but any one can be used.

The identification S24 of the basis of elementary cycles is now discussed.

The previous algorithm provides a labelling of edges of the input graph: label 2 edges are those of the covering tree, label 1 edges are not. According to graph theory, adding a label 1 edge to the covering tree creates a unique elementary cycle (a single loop), which can be identified by the said edge.

Each elementary cycle is obtained by adding a label 1 edge to the covering tree. Added edge is removed before next label 1 edge is added. Noting $n_1$ the number of edges, $n_0$ the number of vertices and $n_c$ the number of elementary cycles, $n_c$ can be computed by the formula:

$$n_c = n_1 - n_0 + 1$$

S26 is now discussed.

S26 may start with a testing of whether a cycle is a boundary cycle or not (in order to filter out boundary cycles).

The inputs of the algorithm are:
A closed and oriented skin defined by faces, edges and vertices.
The cycle L defined by its list of edges.

The output of the algorithm is the answer "yes" or "no" to the question "is the input cycle a boundary cycle?".

The principle of the algorithm is as follows. Marching from one side of the cycle (along faces of the B-Rep), if it is possible to reach the other side of the cycle without crossing it, then it is not a boundary cycle. Marching from both sides of the cycle, if the two paths can get together without crossing it, then it is not a boundary cycle. FIGS. 45-46 illustrates the two situations.

The algorithm uses a last-in-first-out (LIFO) list as an internal variable. The label value of a face $f$ is noted m($f$). Labelling face $f$ with value k is symbolized by instruction m($f$):=k. Before starting, all faces are labeled 0. The algorithm is based on the fact that each edge is shared by exactly two faces, which is a property of solids B-Rep.

```
Let f be an arbitrary face
m(f) := +1
Put face f in the LIFO list
While the LIFO list is not empty do begin
    Get f from LIFO list
    For all edges e of the boundary of f do begin
        Let h be the (unique) other face bounded by
        edge e
        If m(h) = 0 then
            If edge e ∈ L then
                m(h) := −m(f)
            else
                m(h) := m(f)
            end if
            Put h in the LIFO list
        else
            if m(h) = m(f) and e ∈ L return "no"
                if m(h) ≠ m(f) and e ∉ L return "no"
        End if
    End for
End while
return "yes"
```

If the input cycle is a boundary cycle, all faces are visited by the algorithm. In this case, the input cycle is the boundary of all faces labeled +1 and it is also the boundary of all faces labeled −1.

FIG. 47 illustrates a boundary cycle (bold lines) and an example of faces labeling.

The reducing of cycles remaining in set R (process S30) is now discussed.

Reducing cycles is the main process of the method of FIG. 1, as this ensures accuracy of the final tension tests (notably, relatively few false positives). The input data is the list of $n_c$ elementary cycles, as computed by previous algorithm. The output data is the list of cycles localizing tunnels on the solid's boundary.

Eliminate Boundary Cycles

The very first step is to eliminate S25 boundary cycles from the list of elementary cycles. This is performed by using, on each elementary cycle, the dedicated "testing a boundary cycle" algorithm described previously. After this step is done, the number of non-boundary elementary cycles is noted $n_b$. By construction, $n_b \leq n_c$. Number $n_b$ depends on the choice of the covering tree used to compute elementary cycles.

Classes of Non-Boundary Cycles

The second step is to arrange S26 non-boundary elementary cycles into equivalence classes according to the homology relationship. This is done as follows.

```
For i := 1 to n_b do begin
    If c_i is not already involved in a class then
        Create a new class Class(c_i) := {c_i}
        For j := i + 1 to n_b do begin
            If c_j is not already involved in a class
            then
                If c_i + c_j is a boundary cycle then
                    Class(c_i) := Class(c_i) ∪ {c_j}
                End if
            End if
        End for
    End if
End for
```

Let $n_h$ be the number of classes of non-boundary elementary cycles. By construction $n_h \leq n_b$. A class may include only one cycle.

Next step is to select S28 a representative non-boundary elementary cycle $r_i$ in each class. It is chosen to have the smallest (cumulated e.g. Euclidian) length amongst all other cycles of the class, if any.

```
For i := 1 to n_h do begin
    r_i := ArgMin { Length(c) ; c ∈ Class(c_i) }
End for
```

Reducing S30 Classes of Non-Boundary Elementary Cycle

This step S30 is the core of the method of the example. The input data is the set R of cycles $r_i$ respectively representing classes of non-boundary elementary cycles. According to the theory, the homology group $H_1$ is a finite group of $2^{2\gamma}$ elements and it is generated by a minimum set of $2\gamma$ elements, named the generators and noted $G=\{h_1, \ldots, h_{2\gamma}\}$. Set $R=\{r_1, \ldots, r_{n_h}\}$ is a subset of $H_1$. This means that for any $r \in H_1$, and, in particular, for any $r \in R$, there exists a subset of integers $I \subseteq \{1, \ldots 2\gamma\}$ such that:

$$r \approx \sum_{i \in I} h_i$$

The previous formula must be understood in the sense of homology classes: there exists a 2-chain w such that $r + \Sigma_{i \in I} h_i = \partial w$ or, equivalently, $r + \partial w = \Sigma_{i \in I} h_i$. Since set R is built on the basis of elementary cycles and according to the fact that any cycle can be written as a sum of elementary cycles, it is sure that elements of R are generators of $H_1$. The point is that set R not always minimal in both meanings: the number of elements $n_h \geq 2\gamma$ and the (e.g. Euclidian) length of cycles.

The algorithm iteratively reduces as much as possible the number of cycles in set R as well as their respective (e.g. Euclidian) length. The smallest number of cycles in the final reduced R, noted $R_0$, is known from the theory ($|R| \geq |R_0| \geq 2\gamma$) but it may happen that $|R_0| > 2\gamma$ at the end of the algorithm. Nevertheless, all the $\gamma$ tunnel-like cycles can be found in $R_0$.

The iterative algorithm of the example of FIG. 1 includes three schemes: add adjacent faces, combine cycles and (optional) split into simple cycles. The schemes may be applied in any order, and the selection of the subject items of each scheme may be selected in any order. Convergence of the iteration may be decided in any way known to the skilled person, being noted that the result is not unique (as the iteration process may be performed in different ways). In an example, S32 is iterated as much as possible (resulting in minimal length for the elements of set R, and then S34 and S36 are iterated in an interlaced manner, S36 being applied each time the result of S34 provides the possibility of a splitting).

Length Reduction by Adding Adjacent Faces S32

Length reduction through adjacent faces may be implemented as follows. The input data is a non-boundary cycle u and the output data is the shortest cycle homologous to cycle u according to the wireframe topology of the solid. The label of face $f$ is noted $m(f)$. Labelling face $f$ with value k is symbolized by instruction $m(f):=k$. Before starting, all faces are labeled "0".

```
While exists a face f adjacent to cycle u such that
m(f) = 0 do begin
    m(f) := 1
    If Length(u + ∂f) < Length(u) then
        u := u + ∂f
    End if
End while
```

This method does not change the number of cycles in R.

Reduction by Combining Non-Boundary Cycles S34

The input data is the set R. The output data is an updated set R including less cycles and shorter cycles.

Reduction by combining cycles may be implemented as follows. Let $r_i$ and $r_j$ be two cycles of R, and $r_k$ the longest one of both. Their sum is noted $r = r_i + r_j$. If r is a boundary cycle, it means that $r_k$ is homologous to a sum of cycles of R and thus is superfluous. It is eliminated from R. Otherwise, $r_k$ is replaced by r if Length(r) is smaller than Length($r_k$). The algorithm is:

```
For i := 1 to n_h do begin
    For j := 1 to n_h do begin
        If i ≠ j then
            r := r_i + r_j
            k := ArgMax { Length(r_p) ; p = i,j }
            If r is a boundary cycle then
                r_k := 0
            Else if Length(r) < Length(r_k) then
                r_k := r
            End if
        End if
    End for
End for
Remove zero cycles from R.
```

Splitting into Simple Cycles S36

The splitting S36 into simple cycles is an option that further improves the method. It can be performed after each iteration of S34 or after S34 has converged. Then, iterations of S34 may be performed again, and then S36 may be performed again, until convergence. Such interlacing of iterations of S34 and S36 can be implemented in any way.

S36 can be implemented as follows. The first step is to separate connected components, which is a classical algorithm in the art of graph theory. Next step is to find simple cycles. Start with an arbitrary vertex and follow a path of edges from this vertex until a visited vertex is reached. Repeat the process until all edges are visited. It should be noticed that all vertices have an even number of incident edges, otherwise, the 1-chain is not a cycle. This method increases the number of elements in R, but the overall length $\Sigma_{i=1}^{n_h}$ Length($r_i$) is maintained.

Once set R is correctly reduced, the method can accurately identify location of tunnels. In the example of FIG. 1, this is done by calculating S42, for each cycle of (reduced) set R, a value representative of the consistence, along the cycle, between the direction of the curvature of the cycle and the outside normal of the B-Rep, and then determining S44 the n cycles having the highest value as location of tunnels to be identified (i.e. the output of the method). The other cycles are simply and arbitrarily not considered (and they may be theoretically considered as handles rather than tunnels). An example where the consistence value (for a respective cycle) is an integral (along the cycle) of the sign of a scalar product (i.e. +1 when the scalar product is positive and −1 when the scalar product negative) between the curvature of the cycle and the outside normal of the B-Rep and referred to as "tension of a cycle" is discussed in the following. In particular, in this example the case of sharp edges (being at least a part of the cycle along which the integral is evaluated) may be handled as follows: when the cycle corresponds to a sharp edge of the B-Rep and the outside normal of the B-Rep thereby consists of two vectors along the cycle, the sign of the scalar product is the maximum sign when the sharp edge is convex and the minimum sign when the sharp edge is non-convex (the maximum and/or the minimum being between the two possibilities offered by the existence of two normal vectors along the sharp edge).

Tension of a Cycle

Let $C: [0, L] \rightarrow \mathbb{R}^3$ be a smooth closed curve. It is parameterized with arc length and L is its length. Consequently, the tangent vector is normalized $|C'(t)|=1$ for all $t \in [0, L]$ and the second derivative vector is perpendicular to the tangent vector $\langle C'(t), C''(t) \rangle = 0$ for all $t \in [0, L]$. If this closed curve is an elastic material, it is well known from prior art that the elastic force F at point C(t) is oriented along the curvature vector C''(t).

Smooth Curve on a Smooth Surface

Now, the elastic curve is on a smooth closed surface being the boundary of a solid. The outer normal of the smooth surface at point C(t) is noted N(t). The elastic force tends to push point C(t) inside the solid when $\langle C''(t), N(t) \rangle < 0$. Conversely, the elastic force tends to pull point C(t) away from the solid when $\langle C''(t), N(t) \rangle > 0$. FIGS. 48-49 illustrate both situations with outer normal vector 482 and curvature vector 484 respectively in opposite and the same direction. When $\langle C''(t), N(t) \rangle = 0$ the elastic curve slides on the solid and nothing else can be concluded, as illustrated in FIG. 50.

The tunnel vs. handle type of a smooth closed curve on a smooth closed surface is defined by measuring the length of the elastic curve where the force is directed inside the solid or outside the solid. Precisely, let $\varphi: [0, L] \rightarrow \{-1, 0, +1\}$ be a mapping defined by $\varphi(t) = -1$ if $\langle C''(t), N(t) \rangle < 0$, $\varphi(t) = +1$ if $\langle C''(t), N(t) \rangle > 0$ and $\varphi(t) = 0$ if $\langle C''(t), N(t) \rangle = 0$. The curve C is a tunnel (resp. a handle) if $\int_0^L \varphi(t)dt < 0$ resp. $\int_0^L \varphi(t)dt > 0$. Function $\varphi$ is considered (rather than the scalar product itself) in order to increase robustness of the method (and make it resist to local singularities). The integral value is computed to have a global view and discard irregularities.

For example, let a and b respectively be the small and large radius of the torus illustrated in FIGS. 48-50. In FIG. 48, $\langle C''(t), N(t) \rangle < 0$ for all $t \in [0, 2\pi a]$ so $\int_0^{2\pi a} \varphi(t)dt = -2\pi a < 0$, meaning that curve C is a handle. Conversely, in the situation of FIG. 49, $\langle C''(t), N(t) \rangle > 0$ for all $t \in [0, 2\pi b]$ so $\int_0^{2\pi b} \varphi(t)dt = 2\pi b > 0$, meaning that curve C is a tunnel.

A goal is to generalize this definition to the boundary of solid that features sharp edges and sharp vertices. By nature, a 3D point that belongs to the boundary of a solid is an inside point of a face or an inside point of a sharp edge or a sharp vertex. In the context of the method, a point inside a smooth edge or at a smooth vertex is equivalent to a point inside a face because the outer normal is well defined. Furthermore, curve C is a path of edges of the solid.

The method of the example may thus apply the following schemes to achieve an accurate result.

Point C(t) is Inside a Face

If C(t) is inside a face, then the outer normal N(t) is well defined and the values of mapping $\varphi(\bullet)$ are as follows.

| $\langle C''(t), N(t) \rangle$ | $\varphi(t)$ |
| --- | --- |
| + | +1 |
| 0 | 0 |
| − | +1 |

Point C(t) is Inside a Sharp Edge

Now, C''(t) is well defined but where N(t) is not, meaning that curve C locally coincides with a sharp edge of the solid. This situation is the most common since, by nature, curve C is a path of edges. Then, there exists two adjacent faces to C(t), face 1 and face 2, and it is possible to compute scalar products $\langle C''(t), N_1(t) \rangle$ and $\langle C''(t), N_2(t) \rangle$ where $N_i$ are the normal vectors of adjacent faces (numbering order is not meaningful). The mapping $\varphi(\bullet)$ is defined according to the signs of scalar products and to the local convexity of the sharp edge at point C(t).

Next table includes the values of mapping $\varphi(\bullet)$ at a point C(t) when the sharp edge is convex. Notice that this table is equal to the previous one when $N_1(t) = N_2(t)$.

| $\langle C''(t), N_1(t) \rangle$ | $\langle C''(t), N_2(t) \rangle$ | $\varphi(t)$ |
| --- | --- | --- |
| + | + | +1 |
| 0 | + | +1 |
| − | + | +1 |
| + | 0 | +1 |
| 0 | 0 | 0 |
| − | 0 | 0 |
| + | − | +1 |
| 0 | − | 0 |
| − | − | −1 |

Figure 51:
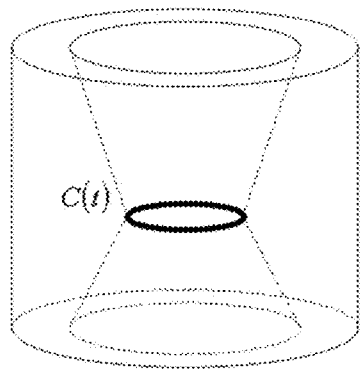
Figure 52:
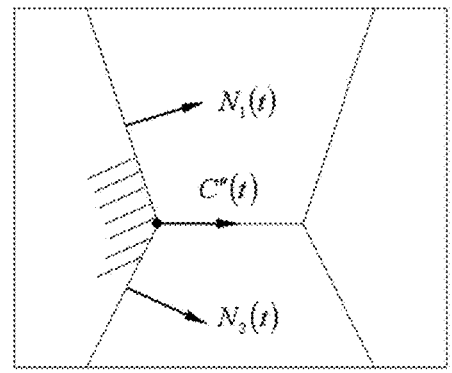

FIGS. 51-52 illustrate a curve C which is a convex sharp edge of the solid. Clearly, $\varphi(t) = 1$ in the (+, +) situation.

Next table includes the values of mapping $\varphi(\bullet)$ at a point C(t) when the sharp edge is non-convex. Notice that this table is equal to the first one when $N_1(t) = N_2(t)$.

| $\langle C''(t), N_1(t) \rangle$ | $\langle C''(t), N_2(t) \rangle$ | $\varphi(t)$ |
| --- | --- | --- |
| + | + | +1 |
| 0 | + | 0 |
| − | + | −1 |
| + | 0 | 0 |
| 0 | 0 | 0 |
| − | 0 | −1 |
| + | − | −1 |
| 0 | − | −1 |
| − | − | −1 |

Figure 53:
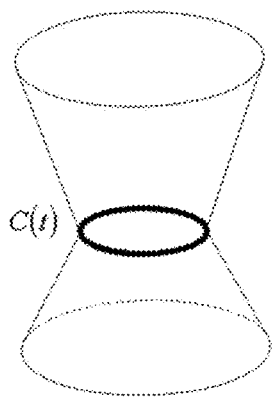
Figure 54:
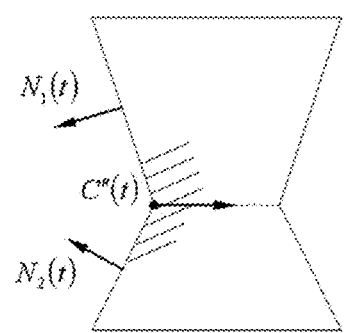

FIGS. 53-54 illustrate a curve C which is a non-convex sharp edge of the solid. Clearly, $\varphi(t) = -1$ in the (−, −) configuration.

Point C(t) is at a Sharp Vertex

The sharp vertex situation is used when previous computations do not yield any conclusion, mainly because $\int_0^L \varphi(t)dt = 0$. This always happens when curve C involves line segments on planar faces. At a sharp vertex $C(t_0)$, curve C is the junction of two smooth curves, respectively $C_-(t)$ and $C_+(t)$, meaning that $C(t) = C_-(t)$ for $t < t_0$ and $C(t) = C_+(t)$ for $t > t_0$. Curves $C_-$ and $C_+$ respectively have two adjacent faces. Let $F(t_0) = C_+'(t_0) - C_-'(t_0)$ be the elastic force at $t_0$. The diagnosis combines evaluations of mapping $\varphi(\bullet)$ respectively computed using curves $C_-$ and $C_+$. For $\varepsilon \in \{-, +\}$, the value $\varphi(t_0^\varepsilon)$ is computed according to the following table if curve $C_\varepsilon$ is a convex edge.

| $\langle F(t_0), N_1^\varepsilon(t_0) \rangle$ | $\langle F(t_0), N_2^\varepsilon(t_0) \rangle$ | $\varphi(t_0^\varepsilon)$ |
| --- | --- | --- |
| + | + | +1 |
| 0 | + | +1 |
| − | + | +1 |
| + | 0 | +1 |
| 0 | 0 | 0 |
| − | 0 | 0 |
| + | − | +1 |
| 0 | − | 0 |
| − | − | −1 |

For $\varepsilon \in \{-, +\}$, the value $\varphi(t_0^\varepsilon)$ is computed according to the following table if curve $C_\varepsilon$ is a non-convex edge.

| $\langle F(t_0), N_1^\varepsilon(t_0)\rangle$ | $\langle F(t_0), N_2^\varepsilon(t_0)\rangle$ | $\varphi(t_0^\varepsilon)$ |
|---|---|---|
| + | + | +1 |
| 0 | + | 0 |
| − | + | −1 |
| + | 0 | 0 |
| 0 | 0 | 0 |
| − | 0 | −1 |
| + | − | −1 |
| 0 | − | −1 |
| − | − | −1 |

Notice that the two previous tables are equal to the first one when $N_1^\varepsilon(t_0)=N_2^\varepsilon(t_0)$.

Whether elastic curve C is pulled outside or inside the solid at vertex $C(t_0)$ is disclosed by the values $\varphi(t_0^-)$ and $\varphi(t_0^+)$. Next table gathers all possibilities.

| $\varphi(t_0^-)$ | $\varphi(t_0^+)$ | Type |
|---|---|---|
| +1 | +1 | Outside |
| 0 | +1 | Outside |
| −1 | +1 | Unknown |
| +1 | 0 | Outside |
| 0 | 0 | Unknown |
| −1 | 0 | Inside |
| +1 | −1 | Unknown |
| 0 | −1 | Inside |
| −1 | −1 | Inside |

Figure 55:
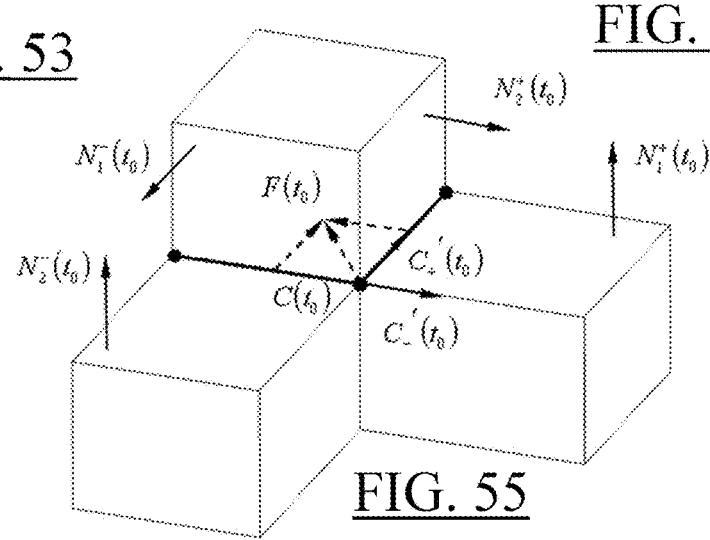

FIG. 55 illustrates a complex vertex $C(t_0)$ shared by six edges. Curve C includes the bold line segments. The type is "Inside". Indeed, $\varphi(t_0^-)=-1$ in the $(-,0)$ configuration because $\langle F(t_0), N_1^-(t_0)\rangle<0$ and $\langle F(t_0), N_2^-(t_0)\rangle=0$. Furthermore, $\varphi(t_0^+)=-1$ as well in the $(0,-)$ configuration because $\langle F(t_0), N_1^+(t_0)\rangle=0$ and $\langle F(t_0), N_2^+(t_0)\rangle<0$. Force $F(t_0)$ tends to push point $C(t_0)$ of curve C inside the solid.

Figure 56:
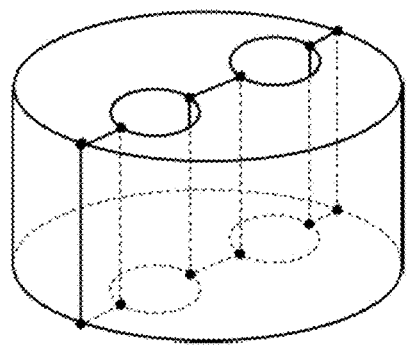

A full implementation of the algorithm of FIG. 1 is exemplified with the solid represented on FIG. 56.

Next table collects the balance of topological entities and useful Euler formulas.

| Type | Symbol | Value | Formula |
|---|---|---|---|
| Number of vertices | $n_0$ | 12 | — |
| Number of edges | $n_1$ | 24 | — |
| Number of faces | $n_2$ | 10 | — |
| Genus | $\gamma$ | 2 | $n_0 - n_1 + n_2 = 2(1-\gamma)$ |
| Number of elementary cycles | $n_c$ | 13 | $n_c = n_1 - n_0 + 1$ |

Figure 57:
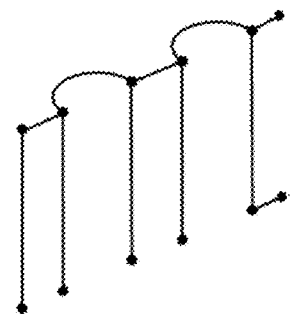
Figure 58:
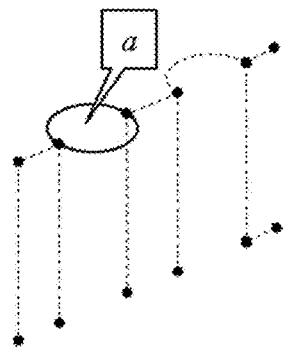
Figure 59:
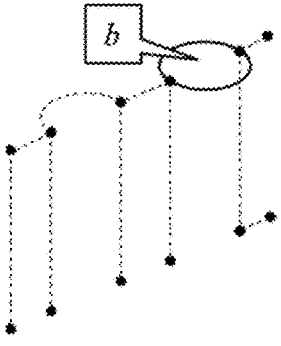
Figure 60:
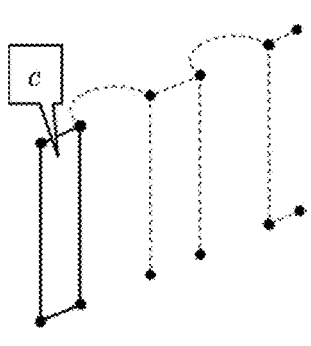
Figure 61:
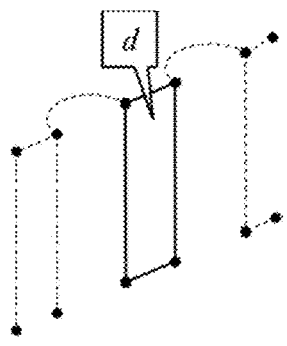
Figure 62:
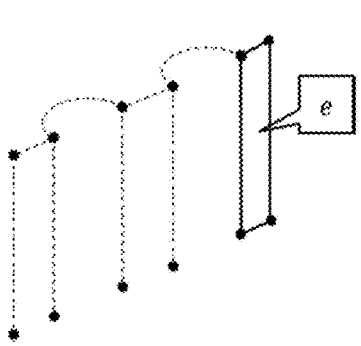
Figure 63:
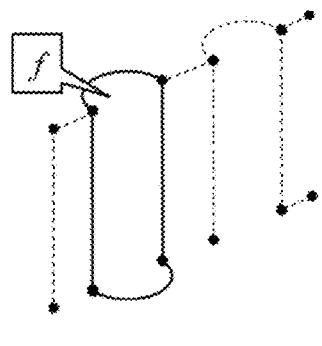
Figures 71, 72, 73:
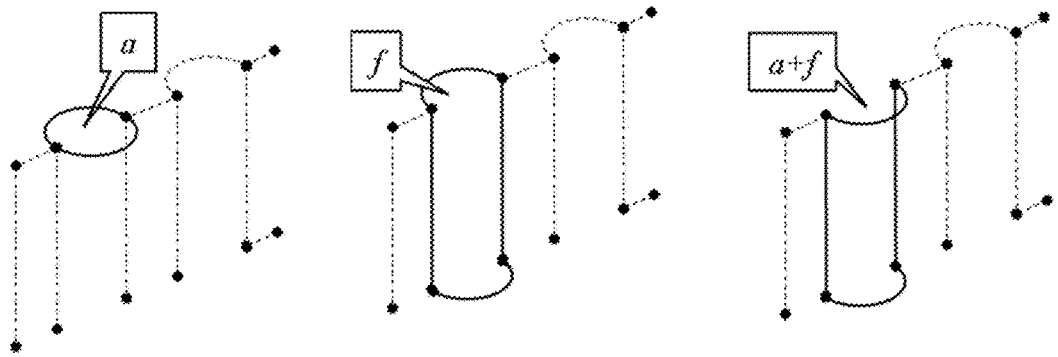
Figures 74, 75:
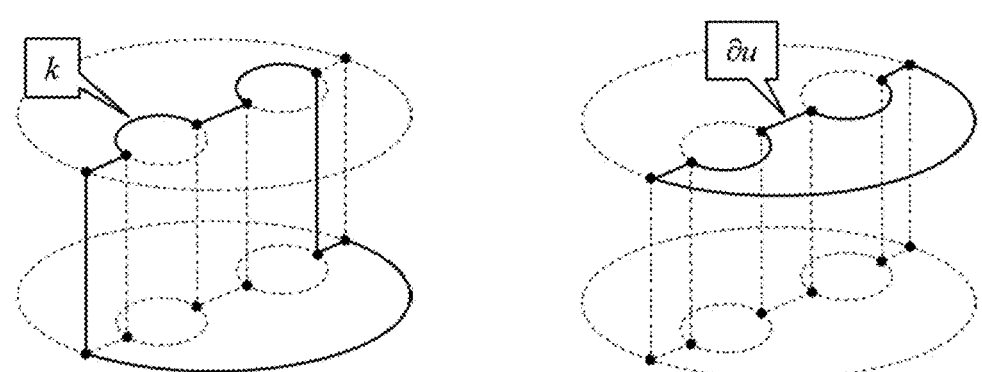
Figures 76, 77:
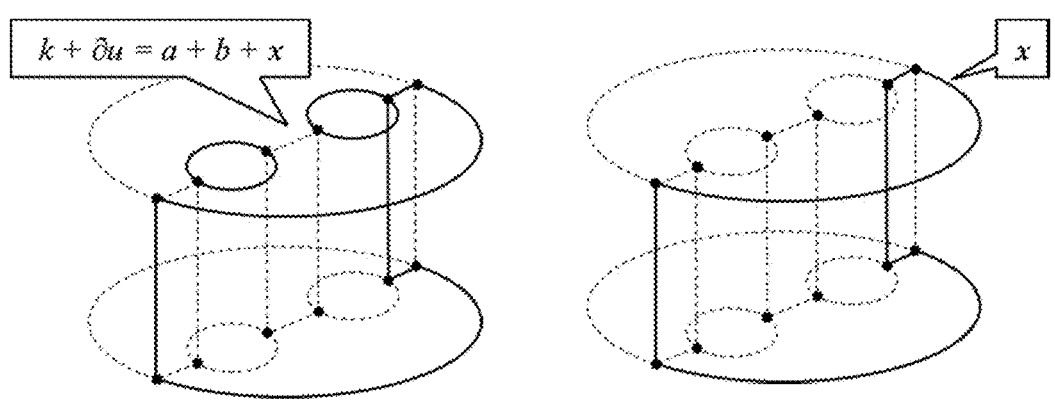

FIG. 57 illustrates the covering tree that is used to compute the basis of elementary cycles. FIG. 58-70 illustrate the $n_c=13$ elementary cycles. For clarity, edges of the covering tree are dotted lines. This helps locating cycle on the solid's B-Rep. Clearly, cycles i, l, m are boundary cycles, so they are discarded. The $n_b=10$ non-boundary cycles are {a, b, c, d, e, f, g, h, j, k}. Computing the classes of non-boundary cycles yields $n_h=7$ classes {a, f}, {b, g}, {c}, {d}, {e, j}, {h} and {k}. For example, FIGS. 71-73 illustrate that cycle a+f is the boundary of a face, meaning that cycles a and f are homologous. According to the length criterion, the $n_h=7$ representative cycles are R={a, b, c, d, e, h, k} because Length(a)<Length(f), Length(b)<Length(g) and Length(e)<Length(j). Clearly, the set R is not minimal because $n_h=7>4=2\gamma$. The reduction process of R is continued by adding boundary cycles of adjacent faces. For example, cycle k can be exploded by adding cycle $\partial_2 u$ where u (adjacent face to k) is the top half face of the solid, as shown on FIGS. 74-75. The resulting cycle $k+\partial_2 u=a+b+x$ includes cycles a and b as illustrated in FIG. 76. Components a and b are separated, and k is advantageously replaced in R by x, as illustrated in FIG. 77.

Figure 78:
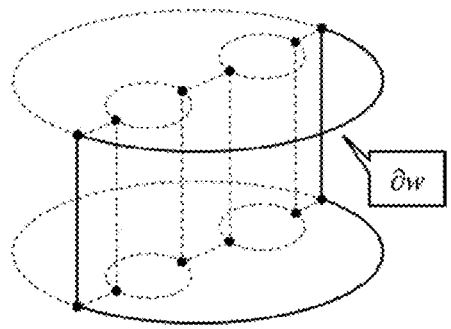
Figure 79:
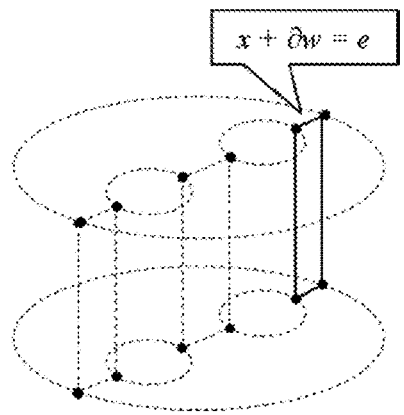

Next iteration is to shorten x by adding $\partial_2 w$, where w is the right half cylindrical face of the solid's B-Rep, which yields cycle e, as illustrated in FIGS. 78-79. It turns out that, from the algebraic point of view, k=a+b+e because k+(a+b+e)=$\partial_2$(u+w). Then, the step of combining cycles together eliminates the duplicated a, b and e. Cycle h is reduced to a and b as well by using similar technique: $h+\partial_2 u=a+b$ and is eliminated from set R for the same reason. Cycles a, b, c, d, e are kept unchanged by the reduction process, so that finally, $R_0=\{a, b, c, d, e\}$. Notice that $5=|R_0|>4=2\gamma$, but the tunnel-like cycles a and b are there.

Figure 80:
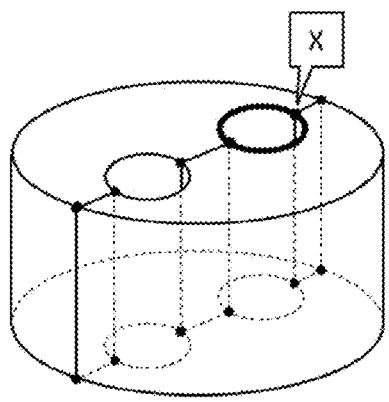
Figure 81:
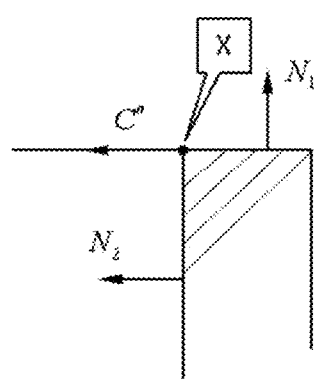
Figure 82:
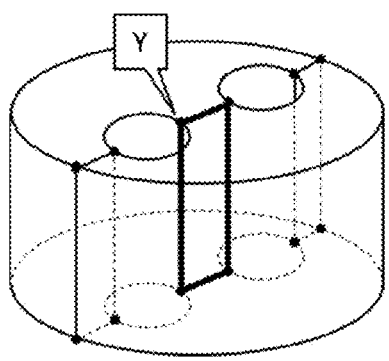
Figure 83:
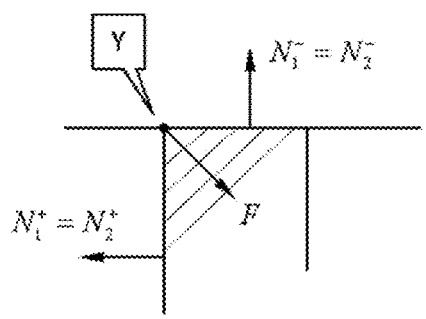
Figure 84:
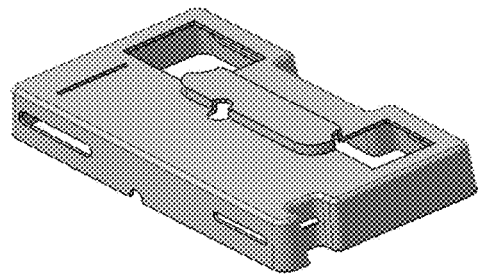
Figure 85:
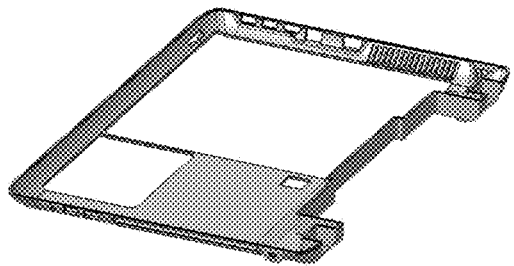
Figure 86:
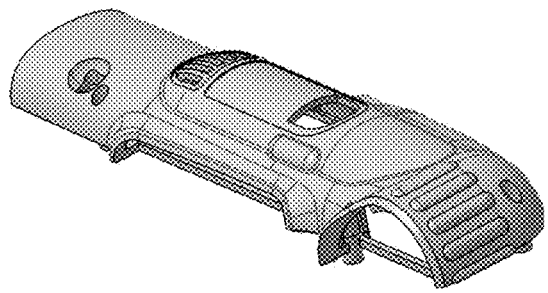
Figure 87:
Figure 88:
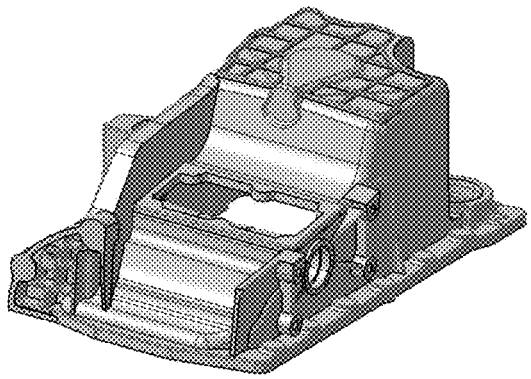
Figure 89:
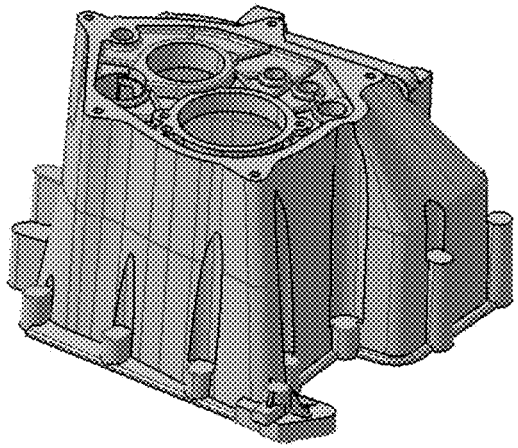
Figure 90:
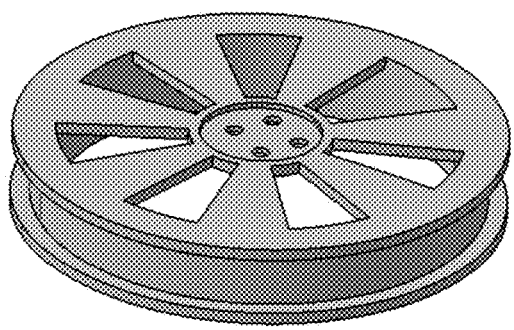
Figure 91:
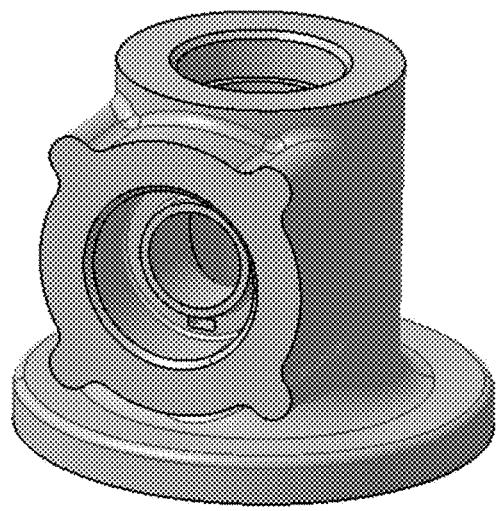
Figure 92:
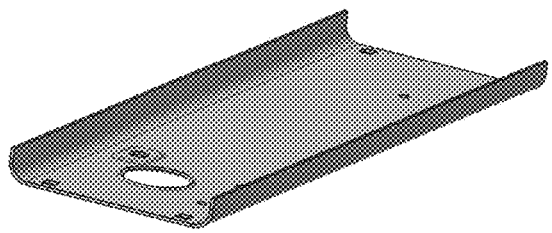
Figure 93:
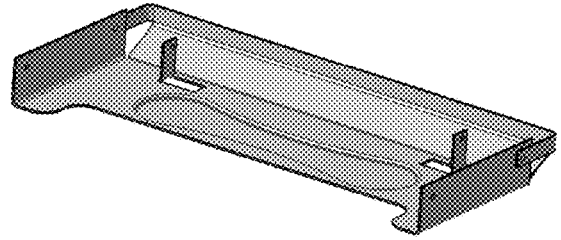
Figure 94:
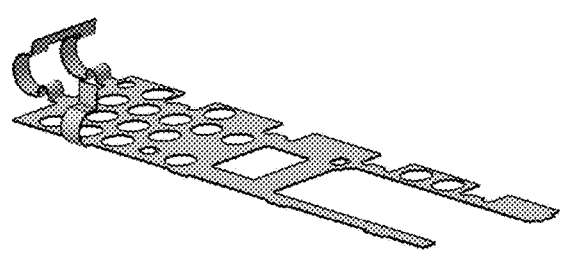

The very last step is to identify that cycles a and b are tunnels and that cycles c, d and e are handles by using the cycle tension criteria. A local section of the solid in the neighborhood of point X of cycle b is as shown on FIGS. 80-81. Clearly, $\varphi=1$ all along curve b because $\langle C'', N_1\rangle=0$, $\langle C'', N_2\rangle>0$ and curve b is a convex sharp edge. Same for cycle a. Cycle d is made of four line segments, making the integral computation inoperative because C''=0 all along curve d. Local section of the solid in the neighborhood of point Y of curve d is as shown on FIGS. 82-83. Clearly, the type of vertex Y is "Inside" because $\langle F, N_1^-\rangle=\langle F, N_2^-\rangle<0$ and $\langle F, N_1^+\rangle=\langle F, N_2^+\rangle<0$. Same for other vertices of cycle d An implementation of the method of FIG. 1 featuring the different options discussed above has been tested on several B-Reps, representing different parts. Although the number of faces was sometimes relatively very high, the method always located tunnels relatively fast. The results are provided below with reference to FIGS. 84-94:

| FIG. | Name of the part | Number of face | Number of edges | Number of vertices | Euler index | Running time (in ms) |
|---|---|---|---|---|---|---|
| FIG. 84 | Cap | 155 | 424 | 266 | 9 | 109 |
| FIG. 85 | Laptop | 872 | 2438 | 1548 | 32 | 11653 |
| FIG. 86 | Grinder | 991 | 2762 | 1759 | 30 | 9547 |
| FIG. 87 | Hood | 2276 | 6291 | 4029 | 11 | 17050 |
| FIG. 88 | Oil pan | 2073 | 5200 | 3153 | 6 | 5959 |
| FIG. 89 | Gearbox | 1027 | 2822 | 1808 | 16 | 2277 |
| FIG. 90 | wheel | 53 | 165 | 111 | 11 | 46 |
| FIG. 91 | Manifold | 114 | 268 | 163 | 3 | 62 |
| FIG. 92 | Sheath | 90 | 220 | 134 | 10 | 46 |
| FIG. 93 | Cap | 126 | 318 | 192 | 10 | 78 |
| FIG. 94 | Support | 241 | 679 | 438 | 21 | 234 |

Selecting and Removing Cutout Faces

As mentioned earlier, editing the B-Rep by removing identified tunnels and filling the empty space can be performed classically, according to any method known per se. Examples are discussed hereunder.

This edition can be advantageously performed by using APIs of commercial CAD software providing feature recognition and face removal capacities like the CAA library of Dassault Systemes. For clarity and consistency, it is illustrated in the context of the method through a simple example.

Given a tunnel cycle identified by using the method, in an example a step of the process is to select the faces of the cutout and to remove these faces while keeping a closed boundary of the solid.

Identifying the faces of the cutout may be done as follows. By definition, a "depression" is a set of adjacent faces of the solid that is bounded by convex edges. Choosing the left side of the cycle, adjacent faces are collected until a first depression is found. A second depression is found the same way by choosing the right side of the cycle. The depression featuring the shortest boundary curves is selected: it is the cutout.

FIG. 95 illustrates the exemplary solid and the cycle locating a cutout. FIG. 96 is the depression found by propagation on the right side of the cycle. FIG. 97 is the depression found by propagation on the left side of the cycle. The cutout faces are those of the depression featuring the shortest boundary, which is clearly the one in FIG. 96.

Figure 100:
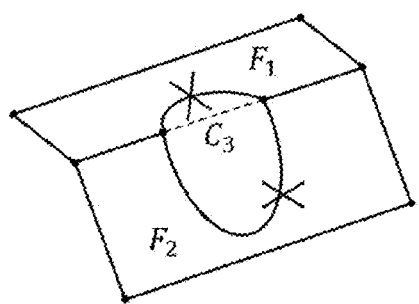
Figure 101:
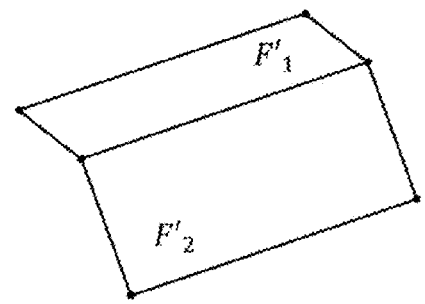

Removing the cutout faces may be done as follows. The first step is to discard all the faces of the cutout from the B-Rep of the solid, which yields an open skin, as illustrated in next figure. The boundary of this open skin includes two cycles. The initial one (cycle A in FIG. 98) used to locating the cutout and the other end of the cutout (cycle B in FIG. 98) computed by the depression recognition. Closing this open skin is explained with cycle B of FIG. 98. Let $F_1$ and $F_2$ be the faces incident to a cycle of the cutout (cycle B in previous figure) and $S_1$ and $S_2$ their respective supporting surfaces. The intersection curve $C=S_1 \cap S_2$ is computed (dotted line in FIG. 99). Portions $C_1$ and $C_5$ of C that are not connected at both ends with the respective boundaries of $F_1$ and $F_2$ are discarded. Portions $C_2$ and $C_4$ of curve C that are locally coincident with boundary edges of $F_1$ or $F_2$ are discarded as well. Boundary portions of $F_1$ and $F_2$ coincident with the cycle are discarded, as illustrated in FIG. 100. Portion $C_3$ of curve C is used to close the open boundaries of faces $F_1$ and $F_2$, yielding final faces $F'_1$ and $F'_2$ that close the B-Rep of the solid in the neighborhood of the cycle shown on FIG. 101. Closing the open skin in the neighborhood of cycle A may then be performed in an easy way. This cycle is the inner loop of a face, and the closing is to discard this inner loop.

It should be understood that the local geometry and topology of the solid in the neighborhood of a cycle can be very complex, depending on the number of faces adjacent to the cycle. An ultimate solution is to compute a filling surface over the cycle and to sew it to the solid.

The invention claimed is:

1. A computer-implemented method for determining specifications of the input of a manufacturing operation that outputs a part having cut-outs, the manufacturing operation consisting in forming the cut-outs via stamping, machining, milling and/or laser cutting, the method comprising:
   providing specifications of the output part, including a user-designed B-Rep having cycles of edges and modeling the part, the cut-outs being represented by the user with tunnels in the B-Rep;
   determining, from equivalence classes of non-boundary cycles of the B-Rep with respect to the cycle-homology relationship, the set that consists of all cycles being the one having the smallest length in a respective equivalence class;
   performing a process on the set that includes iterating:
      replacing a cycle of the set by its $\mathbb{Z}/2\mathbb{Z}$ sum with an adjacent boundary cycle when this reduces the length, and
      for a cycle of the set and its $\mathbb{Z}/2\mathbb{Z}$ sum with a shorter cycle of the set, deleting the cycle when the sum results in a boundary cycle, otherwise replacing the cycle by the sum when this reduces the length;
   then, identifying among the cycles of the set a number n of cycles as location of tunnels, wherein n is the genus of the B-Rep; and then
   editing the B-Rep by removing identified tunnels and filling the empty space and outputting the specifications of the output part with the edited B-Rep.

2. The method of claim 1, wherein the identifying of location of tunnels includes, for each cycle of the set, calculating a value representative of the consistence, along the cycle, between the direction of the curvature of the cycle and the outside normal of the B-Rep, the n cycles having the highest value being then identified as location of tunnels.

3. The method of claim 2, wherein the value is an integral value of the sign of a scalar product between the curvature of the cycle and the outside normal of the B-Rep.

4. The method of claim 3, wherein when the cycle corresponds to a sharp edge of the B-Rep and the outside normal of the B-Rep thereby consists of two vectors along the cycle, the sign of the scalar product is the maximum sign when the sharp edge is convex and the minimum sign when the sharp edge is non-convex.

5. The method of claim 1, wherein the equivalence classes are identified within a basis of elementary cycles, each cycle of the B-Rep being obtainable by a $\mathbb{Z}/2\mathbb{Z}$ sum of elementary cycles.

6. The method of claim 5, wherein the basis of elementary cycles is determined by computing a covering tree of the B-Rep, each elementary cycle corresponding to a respective edge outside the covering tree and being defined by adding the respective edge to the covering tree.

7. The method of claim 1, wherein the process performed on the set also includes then splitting cycles of the set into simple cycles.

8. The method of claim 1, wherein the part is a molded part, a sheet metal piece part, a forming or thermoforming plastic part, a metal casting part, an extrusion or lamination part such as a metal rolling part.

9. A non-transitory computer readable storage medium having recorded thereon a computer program comprising instructions for performing a computer-implemented method for determining specifications of the input of a manufacturing operation that outputs a part having cut-outs, the manufacturing operation consisting in forming the cut-outs via stamping, machining, milling and/or laser cutting, the method comprising:
   providing specifications of the output part, including a user-designed B-Rep having cycles of edges and modeling the part, the cut-outs being represented by the user with tunnels in the B-Rep;
   determining, from equivalence classes of non-boundary cycles of the B-Rep with respect to the cycle-homology relationship, the set that consists of all cycles being the one having the smallest length in a respective equivalence class;
   performing a process on the set that includes iterating:
      replacing a cycle of the set by its $\mathbb{Z}/2\mathbb{Z}$ sum with an adjacent boundary cycle when this reduces the length, and
      for a cycle of the set and its $\mathbb{Z}/2\mathbb{Z}$ sum with a shorter cycle of the set, deleting the cycle when the sum results in a boundary cycle, otherwise replacing the cycle by the sum when this reduces the length;
   then, identifying among the cycles of the set a number n of cycles as location of tunnels, wherein n is the genus of the B-Rep; and then editing the B-Rep by removing identified tunnels and filling the empty space and outputting the specifications of the output part with the edited B-Rep.

10. A system comprising:
a processor coupled to a memory and a graphical user interface, the memory having recorded thereon a computer program comprising instructions for performing a computer-implemented determining of specifications of the input of a manufacturing operation that outputs a part having cut-outs, the manufacturing operation consisting in forming the cut-outs via stamping, machining, milling and/or laser cutting,
wherein the processor is configured by the computer program to:
provide specifications of the output part, including a user-designed B-Rep having cycles of edges and modeling the part, the cut-outs being represented by the user with tunnels in the B-Rep,
determine, from equivalence classes of non-boundary cycles of the B-Rep with respect to the cycle-homology relationship, the set that consists of all cycles being the one having the smallest length in a respective equivalence class,
perform a process on the set that includes iterating:
replacing a cycle of the set by its $\mathbb{Z}/2\mathbb{Z}$ sum with an adjacent boundary cycle when this reduces the length,
for a cycle of the set and its $\mathbb{Z}/2\mathbb{Z}$ sum with a shorter cycle of the set, deleting the cycle when the sum results in a boundary cycle, otherwise replacing the cycle by the sum when this reduces the length,
then, identify among the cycles of the set a number n of cycles as location of tunnels, wherein n is the genus of the B-Rep, and then
edit the B-Rep by removing identified tunnels and filling the empty space and output the specifications of the output part with the edited B-Rep.

11. The method of claim 1, wherein the method further comprises producing an input part according to the outputted specifications.

12. The method of claim 11, wherein the method further comprises performing the manufacturing operation on the produced input part.

* * * * *